US012791069B2

(12) United States Patent
Uno

(10) Patent No.: US 12,791,069 B2
(45) Date of Patent: Nov. 10, 2026

(54) DISC BRAKE AND CARRIER THEREOF

(71) Applicant: Hitachi Astemo, Ltd., Ibaraki (JP)

(72) Inventor: Miyuki Uno, Hitachinaka (JP)

(73) Assignee: Hitachi Astemo, Ltd., Ibaraki (JP)

( * ) Notice: Subject to any disclaimer, the term of this patent is extended or adjusted under 35 U.S.C. 154(b) by 268 days.

(21) Appl. No.: 18/835,749

(22) PCT Filed: Feb. 22, 2023

(86) PCT No.: PCT/JP2023/006442
§ 371 (c)(1),
(2) Date: Aug. 5, 2024

(87) PCT Pub. No.: WO2023/176343
PCT Pub. Date: Sep. 21, 2023

(65) Prior Publication Data
US 2025/0137503 A1 May 1, 2025

(30) Foreign Application Priority Data
Mar. 16, 2022 (JP) ................................ 2022-041133

(51) Int. Cl.
*F16D 65/00* (2006.01)
*F16D 55/226* (2006.01)
*F16D 55/00* (2006.01)

(52) U.S. Cl.
CPC ....... *F16D 65/0056* (2013.01); *F16D 55/226* (2013.01); *F16D 2055/0008* (2013.01)

(58) Field of Classification Search
CPC ............... F16D 55/226; F16D 65/0056; F16D 2055/0008
See application file for complete search history.

(56) References Cited

U.S. PATENT DOCUMENTS 4,611,693 A 9/1986 Wang
8,973,720 B2 * 3/2015 Plantan ................ F16D 65/095 188/73.31
(Continued)

FOREIGN PATENT DOCUMENTS

JP 59-133835 A 8/1984
JP 02-128833 W 10/1990
(Continued)

OTHER PUBLICATIONS

International Search Report received in corresponding International Application No. PCT/JP2023/006442 dated Apr. 4, 2023.
(Continued)

*Primary Examiner* — Thomas W Irvin
(74) *Attorney, Agent, or Firm* — Mattingly & Malur, PC

(57) ABSTRACT

The present disc brake includes a caliper and a carrier. In the carrier, a pair of inner beam part side torque receiving parts are provided inside an arm part in a radial direction of a disc and provided on both sides in a circumferential direction so that a pair of lug parts provided on a first friction pad of a pair of friction pads are respectively housed therein. An attachment part is provided inside the pair of inner beam part side torque receiving parts in a radial direction and is disposed at a position overlapping each of the pair of inner beam part side torque receiving parts in the circumferential direction to be connected to a wheel support part. A first outward protruding part is formed to protrude toward the wheel support part with respect to an attachment surface of the attachment part in a rotation axis direction.

20 Claims, 14 Drawing Sheets

(56) References Cited

U.S. PATENT DOCUMENTS

| | | | | |
|---|---|---|---|---|
| 9,360,066 | B2 * | 6/2016 | Zenzen | B23P 15/18 |
| 11,111,974 | B2 * | 9/2021 | Fischl | F16D 65/0068 |
| 12,092,176 | B2 * | 9/2024 | Singleton | F16D 55/226 |
| 2014/0151165 | A1 * | 6/2014 | Zenzen | F16D 65/0068<br>188/73.31 |
| 2015/0107944 | A1 | 4/2015 | Mallmann | |
| 2016/0356329 | A1 * | 12/2016 | Corcoran | F16D 65/0068 |
| 2020/0003266 | A1 * | 1/2020 | Fischl | F16D 55/2262 |
| 2024/0141964 | A1 * | 5/2024 | Odaira | F16D 65/183 |
| 2024/0159281 | A1 * | 5/2024 | Uno | F16D 55/226 |

FOREIGN PATENT DOCUMENTS

| | | | |
|---|---|---|---|
| JP | 04-111929 | U | 9/1992 |
| JP | 05-8067 | U | 2/1993 |
| JP | 2021-021429 | W | 2/2021 |

OTHER PUBLICATIONS

Written Opinion of the International Searching Authority received in corresponding International Application No. PCT/JP2023/006442 dated Apr. 4, 2023.

* cited by examiner

DISC BRAKE AND CARRIER THEREOF

TECHNICAL FIELD

The present invention relates to a disc brake and a carrier thereof.

Priority is claimed on Japanese Patent Application No. 2022-041133 filed on Mar. 16, 2022, the content of which is incorporated herein by reference.

BACKGROUND ART

For example, some disc brakes used in automobiles have a structure in which a carrier is attached to a non-rotating part of a vehicle, and a pair of pads and a caliper are supported by the carrier (for example, see Patent Document 1).

CITATION LIST

Patent Document

[Patent Document 1]

Japanese Unexamined Patent Application, First Publication No. 2021-21429

SUMMARY OF INVENTION

Technical Problem

It is required to effectively improve a rigidity of a carrier.

An objective of the present invention is to provide a disc brake and a carrier thereof in which a rigidity of the carrier can be effectively improved.

Solution to Problem

A first aspect according to the present invention is a disc brake braking a disc rotating together with a wheel of a vehicle and includes a caliper pressing a pair of friction pads toward the disc in a rotation axis direction of the disc, and a carrier connected to a wheel support part supporting the wheel of the vehicle and disposed to straddle the disc in the rotation axis direction, in which the carrier includes an arm part and an inner beam part, the arm part extends to straddle an outer circumferential side of the disc in the rotation axis direction and is connected to the inner beam part to support the caliper, the inner beam part extends in a circumferential direction with respect to the rotation axis of the disc to be connected to the arm part, is provided at a position facing the wheel support part, and includes a pair of inner beam part side torque receiving parts, an attachment part, and a first outward protruding part, the pair of inner beam part side torque receiving parts are provided inside the arm part in a radial direction of the disc and provided on both sides in the circumferential direction so that a pair of lug parts provided on a first friction pad of the pair of friction pads are respectively housed therein, the attachment part is provided inside the pair of inner beam part side torque receiving parts in the radial direction and is disposed at a position overlapping each of the pair of inner beam part side torque receiving parts in the circumferential direction to be connected to the wheel support part, and the first outward protruding part is formed to protrude toward the wheel support part with respect to an attachment surface of the attachment part in the rotation axis direction and extend from an edge of the attachment surface of the attachment part toward the arm part close to the attachment part.

A second aspect according to the present invention is a disc brake braking a disc rotating together with a wheel of a vehicle and includes a caliper pressing a pair of friction pads toward the disc in a rotation axis direction of the disc, and a carrier attached to a non-rotating part supporting the wheel of the vehicle and disposed to straddle the disc in the rotation axis direction, in which the carrier includes an arm part and an inner beam part, the arm part extends to straddle an outer circumferential side of the disc in the rotation axis direction to be connected to the inner beam part, and is provided at each of positions spaced apart in a disc circumferential direction which is a circumferential direction with respect to the rotation axis of the disc to support the caliper, the inner beam part extends in the disc circumferential direction to be connected to the arm part, is provided between the non-rotating part and the disc, and includes a pair of inner beam part side torque receiving parts, an attachment part, and a thick part, the pair of inner beam part side torque receiving parts are provided on both sides in the disc circumferential direction so that a pair of lug parts provided on a first friction pad of the pair of friction pads are respectively placed therein, the attachment part is provided on a side in a disc center direction, which is a center of rotation of the disc, with respect to the pair of inner beam part side torque receiving parts, and is disposed at a position overlapping each of the pair of inner beam part side torque receiving parts in the disc circumferential direction to be connected to the non-rotating part, and the thick part is provided between the attachment part and the arm part close to the attachment part in the disc circumferential direction, is formed to be thicker in the rotation axis direction than an inner beam part side torque receiving part of the pair of inner beam part side torque receiving parts closer to the attachment part, and is provided at a position overlapping a part of the arm part when viewed from the rotation axis direction.

A third aspect according to the present invention is a carrier of a disc brake braking a disc rotating together with a wheel of a vehicle and includes an arm part extending to straddle an outer circumferential side of the disc in a rotation axis direction of the disc and supporting a caliper pressing a pair of friction pads toward the disc in the rotation axis direction, and an inner beam part extending in a circumferential direction of the disc to be connected to the arm part, provided at a position facing a wheel support part supporting the wheel of the vehicle, and including a pair of inner beam part side torque receiving parts, an attachment part, and a first outward protruding part, in which the pair of inner beam part side torque receiving parts are provided inside the arm part in a radial direction of the disc and provided on both sides in the circumferential direction so that a pair of lug parts provided on a first friction pad of the pair of friction pads are respectively housed therein, the attachment part is provided inside the pair of inner beam part side torque receiving parts in the radial direction and is disposed at a position overlapping each of the pair of inner beam part side torque receiving parts in the circumferential direction to be connected to the wheel support part, and the first outward protruding part is formed to protrude toward the wheel support part with respect to an attachment surface of the attachment part in the rotation axis direction and extend from an edge of the attachment surface of the attachment part toward the arm part close to the attachment part.

Advantageous Effects of Invention

According to each of the above-described aspects of the present invention, it is possible to effectively improve a rigidity of the carrier.

DESCRIPTION OF EMBODIMENTS

An embodiment of a disc brake and a carrier thereof will be described below with reference to the drawings.

Figure 1:
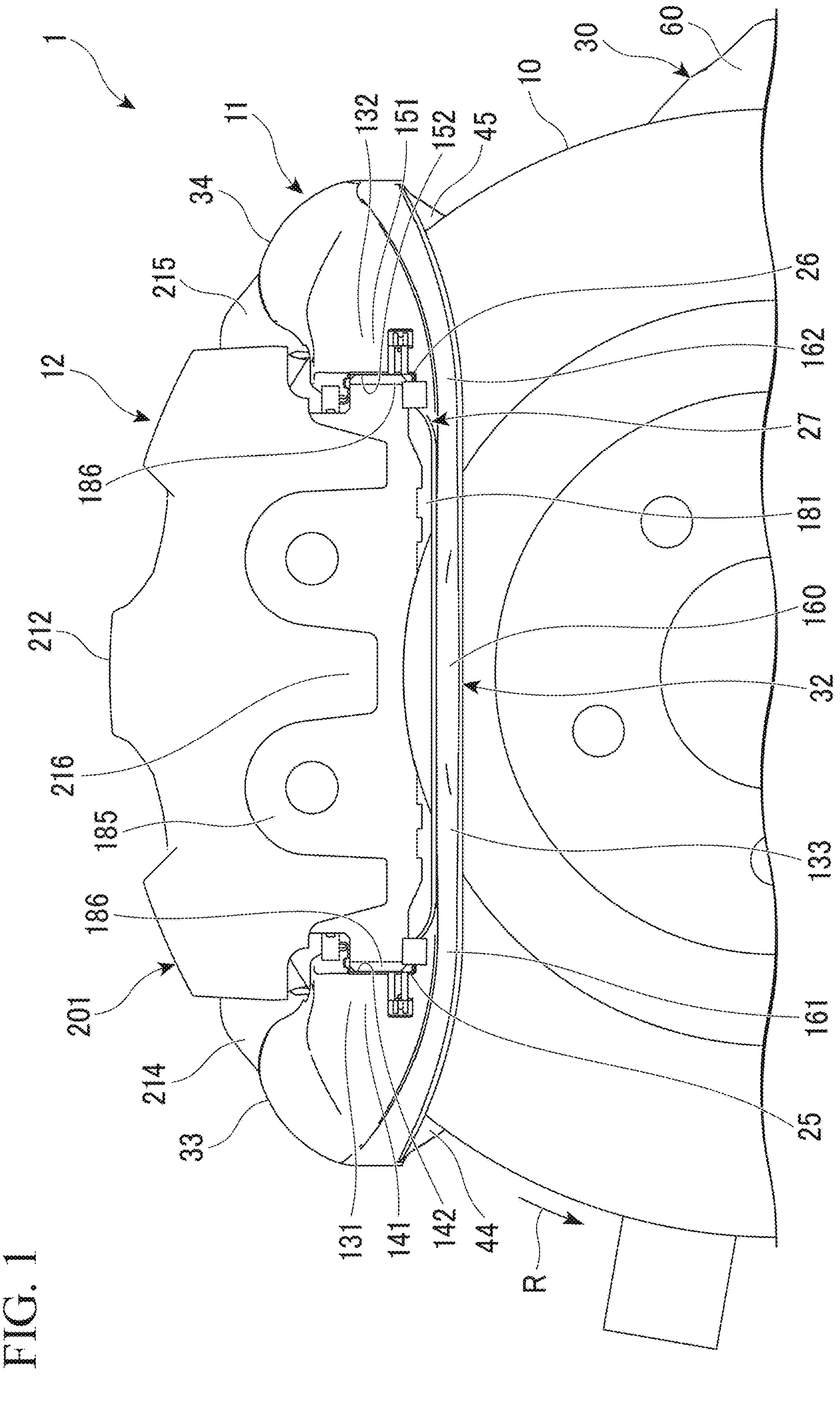
FIG. 1 is a front view showing a disc brake according to an embodiment.
Figure 2:
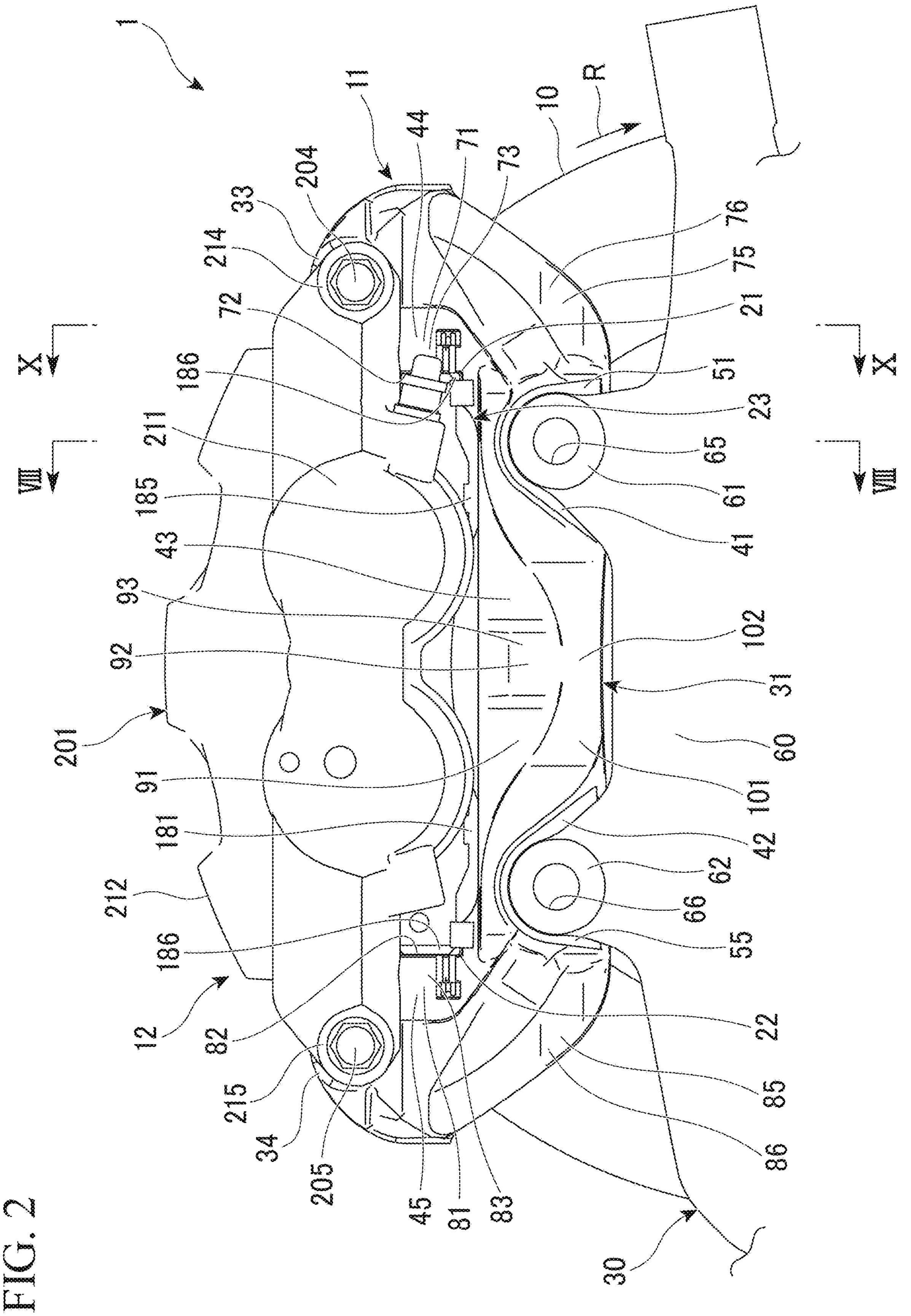
FIG. 2 is a rear view showing the disc brake.

A disc brake 1 of the embodiment shown in FIGS. 1 and 2 applies a braking force to a vehicle such as an automobile. The disc brake 1 is specifically used for braking a four-wheeled vehicle. The disc brake 1 brakes rotation of a disc-shaped disc 10 rotating together with a wheel (not shown) of the vehicle.

The disc brake 1 includes a carrier 11 and a caliper 12. Also, the disc brake 1 includes a first inner beam part side pad spring 21 shown in FIG. 2, a second inner beam part side pad spring 22 and first friction pad 23 (friction pad), a first outer beam part side pad spring 25 shown in FIG. 1, and a second outer beam part side pad spring 26 and second friction pad 27 (friction pad).

Hereinafter, a rotation axis, which is a center of rotation of the disc 10, will be referred to as a disc rotation axis. Also, a direction in which the disc rotation axis extends is referred to as a disc rotation axis direction. A radial direction of the disc 10 in the disc brake 1, that is, a direction orthogonal to the disc rotation axis is referred to as a disc radial direction. A circumferential direction in the disc brake 1 with respect to the disc rotation axis, that is, a rotation direction of the disc 10 is referred to as a disc circumferential direction. A side of the disc rotation axis in the disc radial direction is referred to as a disc radially inward side. A side opposite to the disc rotation axis in the disc radial direction is referred to as a disc radially outward side. A center side in the disc circumferential direction in the disc brake 1 is referred to as a disc circumferential inward side. A side away from the center in the disc circumferential direction in the disc brake 1 is referred to as a disc circumferential outward side. A line extending in the disc radial direction passing through the disc rotation axis and a center of the carrier 11 and the caliper 12 in the disc circumferential direction is referred to as a disc radial reference line. The disc radial reference line is orthogonal to the disc rotation axis. A plane including the disc radial reference line and the disc rotation axis is referred as a disc radial reference plane. An outer side in a vehicle width direction of the vehicle in which the disc brake 1 is provided is referred to as an outer side. An inner side in the vehicle width direction of the vehicle in which the disc brake 1 is provided is referred to as an inner side. An outlet side of the disc 10 in a rotation direction R in the disc brake 1 when the vehicle moves forward is referred to as a disc rotation exit side. An inlet side of the disc 10 in the rotation direction in the disc brake 1 when the vehicle moves forward is referred to as a disc rotation entry side.

As shown in FIG. 2, the carrier 11 is attached and fixed to a non-rotating knuckle 30 (wheel support part, non-rotating part) that supports the wheel of the vehicle. The carrier 11 is fixed to the knuckle 30 while straddling an outer circumferential side of the disc 10 in the disc rotation axis direction. In other words, the carrier 11 is disposed to be connected to the knuckle 30 that supports the wheel (not shown) of the vehicle and straddle the disc 10 in the disc rotation axis direction. In the disc brake 1, the carrier 11 is a mounting member attached to the knuckle 30 which is a vehicle-side part separate from the disc brake 1.

The carrier 11 is made of a metal, specifically, made of an aluminum alloy. The carrier 11 is integrally formed seamlessly. As shown in FIGS. 3 to 7, the carrier 11 includes an inner beam part 31, an outer beam part 32, and a pair of a first arm part 33 (arm part) and a second arm part 34 (arm part). The carrier 11 has a mirror-symmetrical shape with respect to the disc radial reference plane. In other words, the disc radial reference line and the disc radial reference plane pass a center position of the carrier 11 in the disc circumferential direction.

As shown in FIG. 2, the inner beam part 31 is provided on one side of the disc 10 in the disc rotation axis direction. The inner beam part 31 is provided at a position facing the knuckle 30. The inner beam part 31 is attached to the knuckle 30 while extending in the disc circumferential direction. In other words, the inner beam part 31 is provided between the knuckle 30 and the disc 10 in the disc rotation axis direction to be attached to the knuckle 30. Here, the knuckle 30 to which the carrier 11 is attached is disposed on the inner side of the disc 10 in the disc rotation axis direction. Therefore, the inner beam part 31 attached to the knuckle 30 is also disposed on the inner side of the disc 10 in the disc rotation axis direction. The inner beam part 31 faces the disc 10 in the disc rotation axis direction. The inner beam part 31 movably supports the first friction pad 23 shown in FIG. 2 which is one of the pair of the first friction pad 23 and the second friction pad 27 shown in FIG. 1. The first friction pad 23 is disposed on the inner side of the disc 10 in the disc rotation axis direction. The first friction pad 23 is disposed to face the disc 10 in the disc rotation axis direction.

As shown in FIG. 1, the outer beam part 32 is disposed on the other side of the disc 10 in the disc rotation axis direction. The outer beam part 32 is disposed on the outer side of the disc 10 in the disc rotation axis direction. The outer beam part 32 faces the disc 10 in the disc rotation axis direction. The outer beam part 32 movably supports the second friction pad 27 shown in FIG. 1 which is the other of the pair of the first friction pad 23 shown in FIG. 2 and the second friction pad 27 shown in FIG. 1. The second friction pad 27 is disposed on the outer side of the disc 10 in the disc rotation axis direction. The second friction pad 27 is disposed to face the disc 10 in the disc rotation axis direction. Therefore, in the pair of the first friction pad 23 shown in FIG. 2 and the second friction pad 27 shown in FIG. 1, the first friction pad 23 shown in FIG. 2 is disposed on the inner side with respect to the second friction pad 27 shown in FIG. 1 in the disc rotation axis direction. The carrier 11 is a friction pad holding member that holds the first friction pad 23 shown in FIG. 2 and the second friction pad 27 shown in FIG. 1 to be movable in the disc axial direction.

The first arm part 33 and the second arm part 34 shown in FIGS. 3 to 7 are provided to be spaced apart from each other in the disc circumferential direction as shown in FIGS. 1 and 2. The first arm part 33 and the second arm part 34 both extend in the disc rotation axis direction. Both the first arm part 33 and the second arm part 34 cross the outer circumferential side of the disc 10 in the disc rotation axis direction. As shown in FIGS. 3 to 7, the first arm part 33 connects end portions of the inner beam part 31 and the outer beam part 32 on the outer side in the disc radial direction and on the same one side in the disc circumferential direction. Specifically, the first arm part 33 connects end portions of the inner beam part 31 and the outer beam part 32 on the disc rotation exit side. The second arm part 34 connects end portions of the inner beam part 31 and the outer beam part 32 on the outer side in the disc radial direction and on the same other side in the disc circumferential direction. Specifically, the second arm part 34 connects end portions of the inner beam part 31 and the outer beam part 32 on the disc rotation entry side.

The inner beam part 31 includes a first attachment part 41 (attachment part), a second attachment part 42 (attachment part), and an inner connection part 43 connecting the first attachment part 41 and the second attachment part 42. Also, as shown in FIGS. 3 and 5 to 7, the inner beam part 31 includes a first inner beam part side extension part 44 extending from the first attachment part 41 and a second inner beam part side extension part 45 extending from the second attachment part 42. The first attachment part 41, the second attachment part 42, the inner connection part 43, the first inner beam part side extension part 44, and the second inner beam part side extension part 45 are all disposed on the inner side with respect to the disc 10 in the disc rotation axis direction. The first attachment part 41, the second attachment part 42, the inner connection part 43, the first inner beam part side extension part 44, and the second inner beam part side extension part 45 all face a surface of the disc 10 on the inner side in the disc rotation axis direction.

The first attachment part 41 is provided on the disc rotation exit side with respect to a center of the inner beam part 31 in the disc circumferential direction. The second attachment part 42 is provided on the disc rotation entry side with respect to the center of the inner beam part 31 in the disc circumferential direction.

Figure 3:
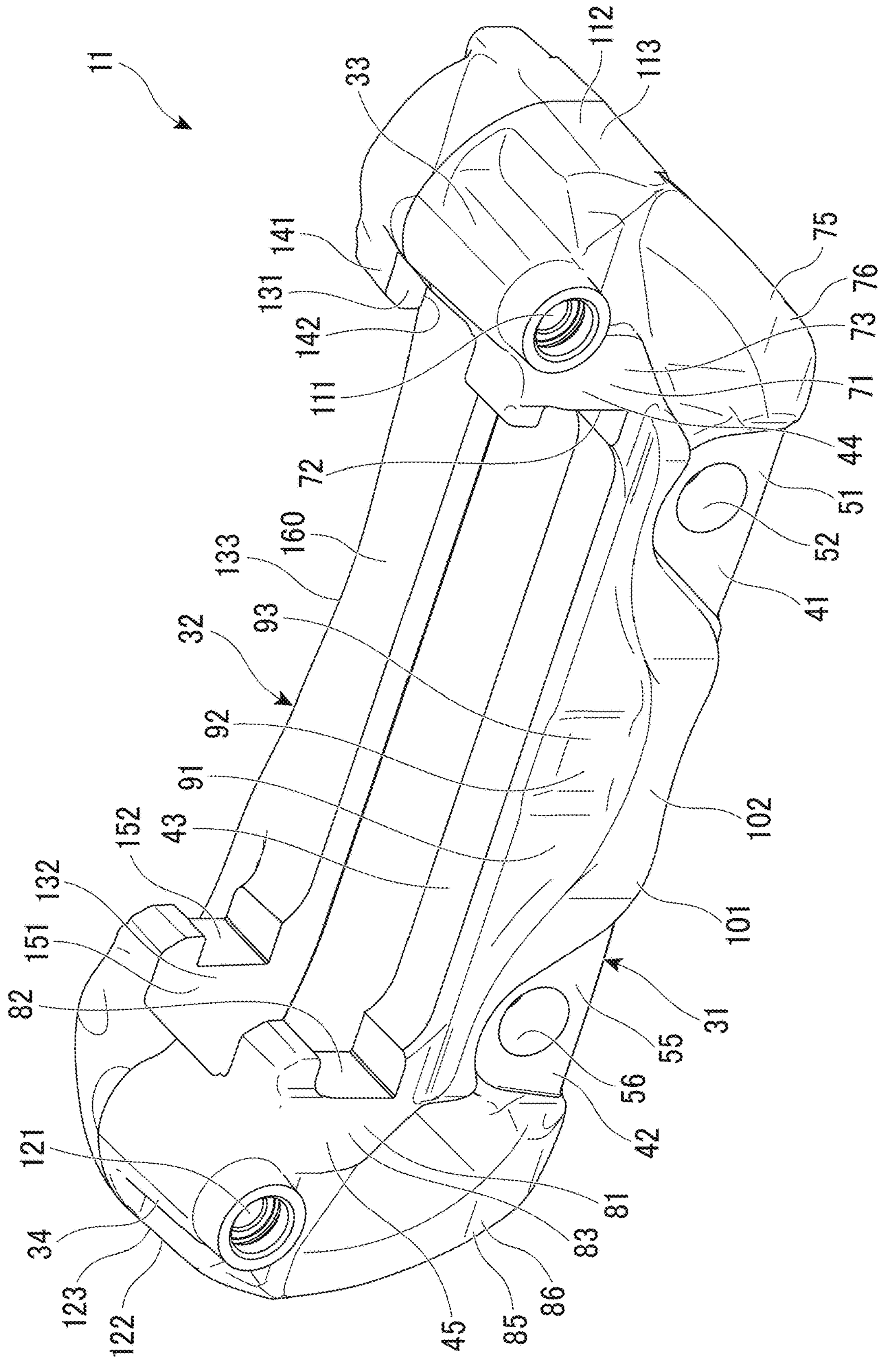
FIG. 3 is a perspective view showing a carrier of the disc brake.
Figure 5:
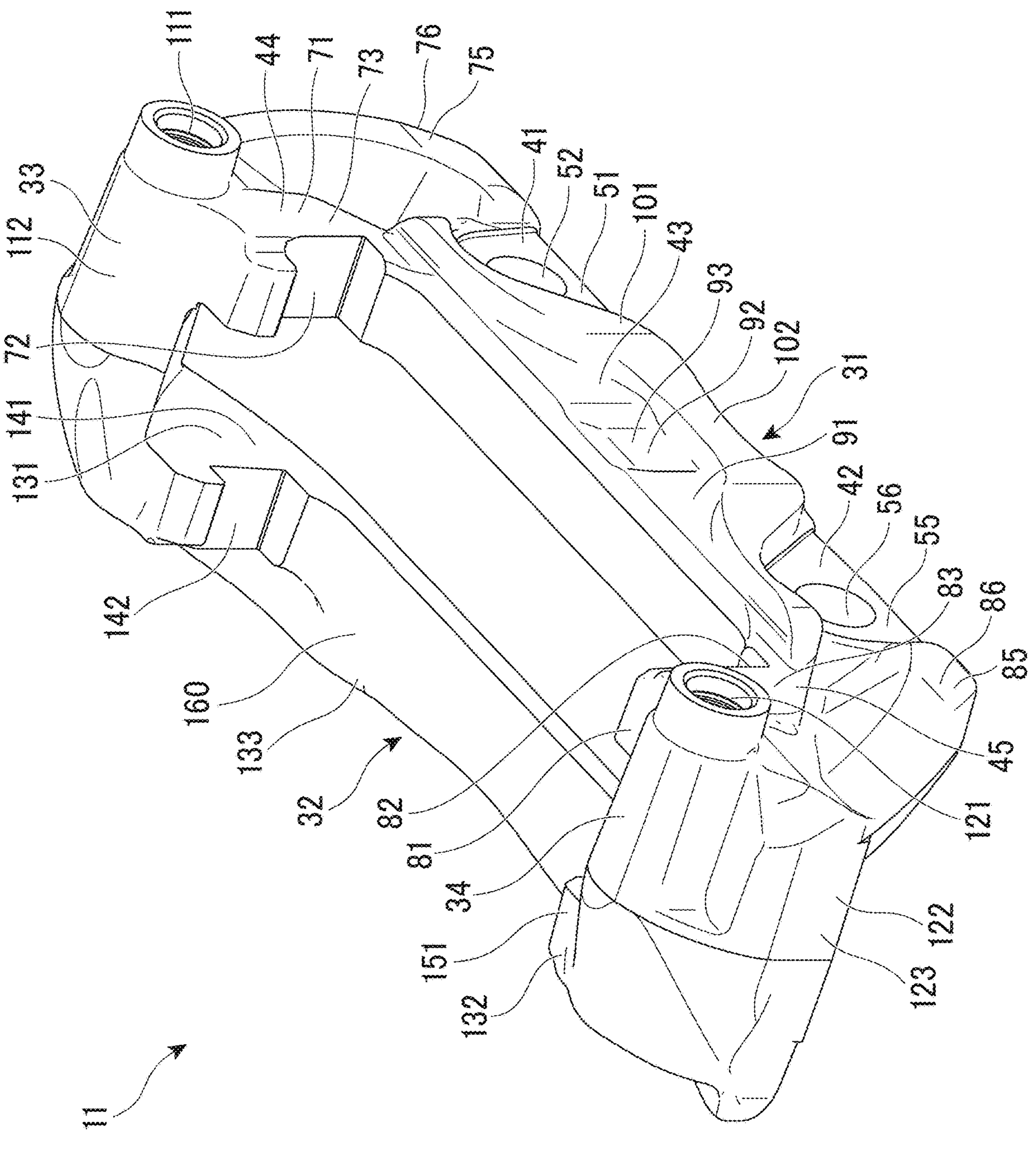
FIG. 5 is a perspective view showing the carrier.
Figure 6:
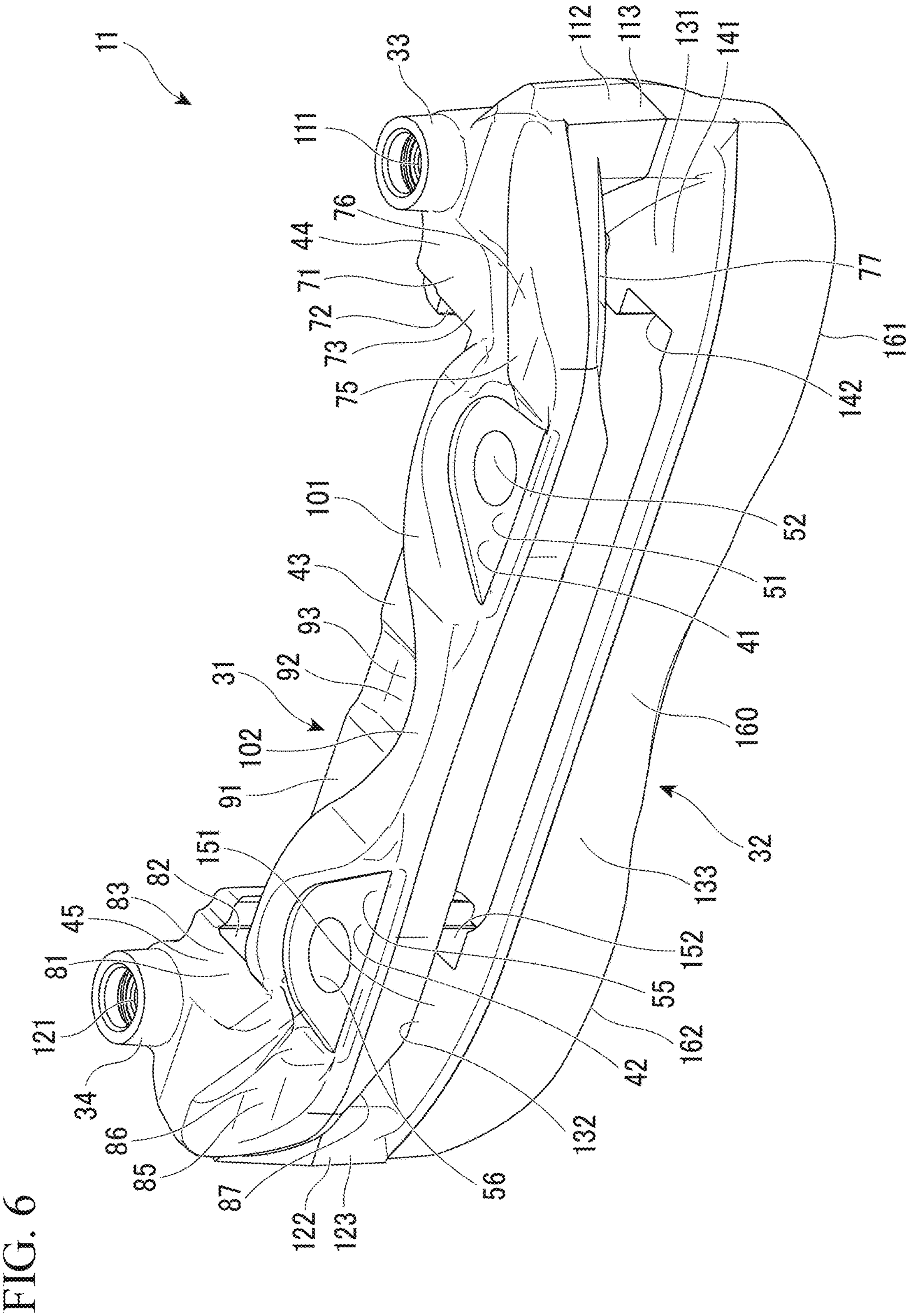
FIG. 6 is a perspective view showing the carrier.

As shown in FIGS. 3, 5, and 6, the first attachment part 41 includes a first attachment surface 51 (attachment surface) and a first attachment hole 52 (hole). The first attachment surface 51 is provided at an end portion on the inner side of the first attachment part 41 in the disc rotation axis direction. As shown in FIG. 2, the first attachment surface 51 faces the knuckle 30 in the disc rotation axis direction. The first attachment surface 51 has a planar shape that extends orthogonal to the disc rotation axis.

The first attachment hole 52 shown in FIGS. 3, 5, and 6 is bored orthogonal to the first attachment surface 51. In other words, the first attachment hole 52 is bored through the first attachment part 41 in the disc rotation axis direction. The first attachment hole 52 penetrates the first attachment part 41 in the disc rotation axis direction at a position of the first attachment surface 51.

The second attachment part 42 includes a second attachment surface 55 (attachment surface) and a second attachment hole 56 (hole). The second attachment surface 55 is provided at an end portion on the inner side of the second attachment part 42 in the disc rotation axis direction. As shown in FIG. 2, the second attachment surface 55 faces the knuckle 30 in the disc rotation axis direction. The second attachment surface 55 has a planar shape that extends orthogonal to the disc rotation axis. The second attachment surface 55 is disposed on the same plane as the first attachment surface 51.

The second attachment hole 56 shown in FIGS. 3, 5, and 6 is bored orthogonal to the second attachment surface 55. In other words, the second attachment hole 56 is bored through the second attachment part 42 in the disc rotation axis direction. The second attachment hole 56 penetrates the second attachment part 42 in the disc rotation axis direction at a position of the second attachment surface 55.

The first attachment part 41 and the second attachment part 42 are mirror symmetrical. The first attachment part 41 and the second attachment part 42 are aligned with each other in position in the disc rotation axis direction. The first attachment part 41 and the second attachment part 42 are aligned with each other in position in a direction of the disc radial reference line. The first attachment part 41 and the second attachment part 42 are spaced apart in the disc circumferential direction.

As shown in FIG. 2, the knuckle 30 includes a knuckle main body part 60, a first protruding part 61, and a second protruding part 62. Both the first protruding part 61 and the second protruding part 62 protrude to the disc radially outward side from the knuckle main body part 60. The first protruding part 61 is provided on the disc rotation exit side with respect to the second protruding part 62. A first through hole 65 penetrating the first protruding part 61 in the disc rotation axis direction is formed in the first protruding part 61. A second through hole 66 penetrating the second protruding part 62 in the disc rotation axis direction is formed in the second protruding part 62.

Figure 8:
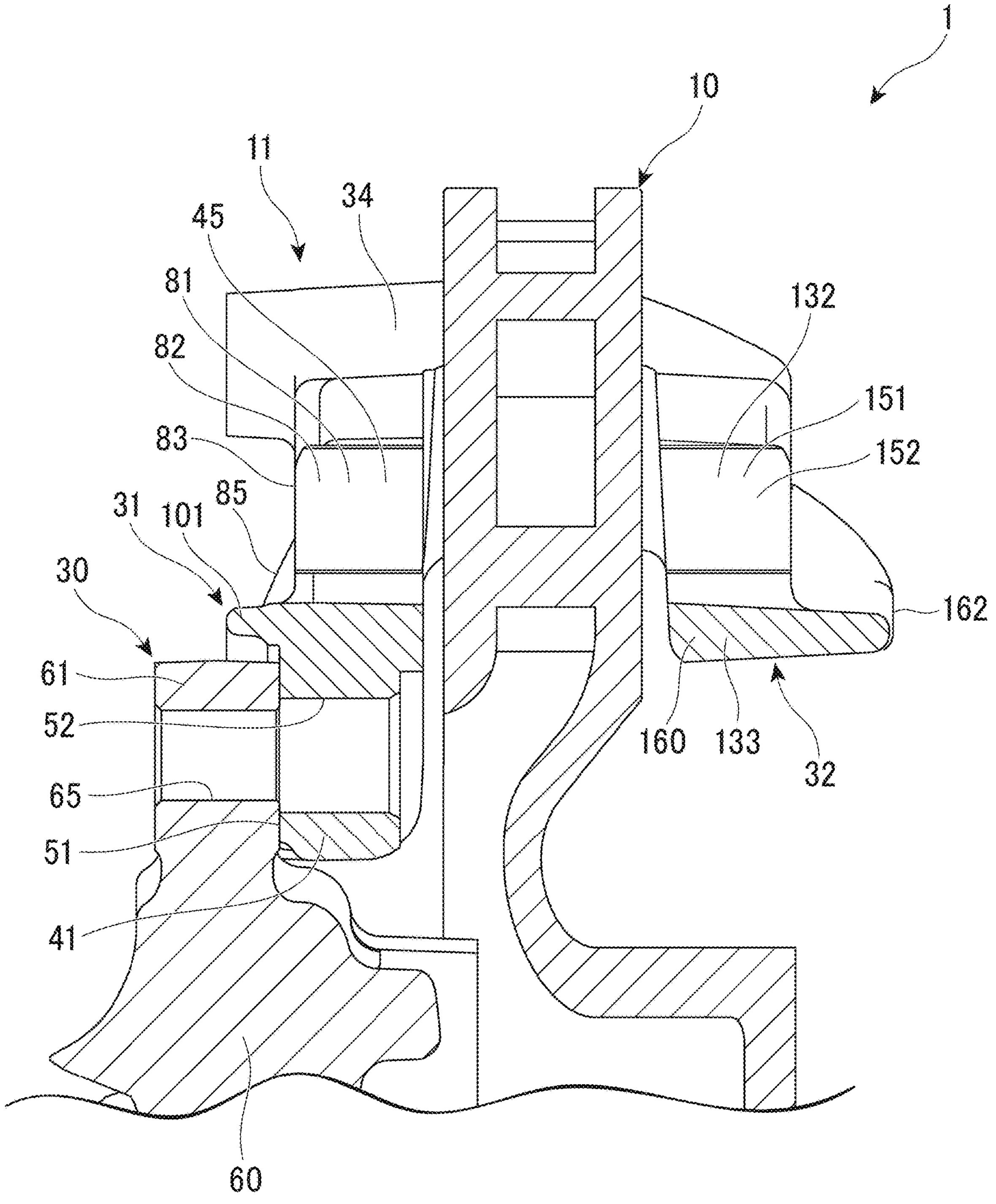
FIG. 8 is a cross-sectional view along line VIII-VIII in FIG. 2 showing a disc, the carrier, and a knuckle of the disc brake of the embodiment.

The carrier 11 is in a state in which the first attachment part 41 is abutted against the first protruding part 61 of the knuckle 30 on the first attachment surface 51 as shown in FIG. 8, and the second attachment part 42 shown in FIGS. 3, 5, and 6 is abutted against the second protruding part 62 of the knuckle 30 shown in FIG. 2 on the second attachment surface 55. In this state, the first attachment part 41 is positioned and fixed to the first protruding part 61 by a first fastener (not shown) inserted through the first through hole 65 and the first attachment hole 52 shown in FIG. 8. At the same time, the second attachment part 42 shown in FIG. 3 or the like is positioned and fixed to the second protruding part 62 shown in FIG. 2 by a second fastener (not shown) inserted through the second through hole 66 shown in FIG. 2 and the second attachment hole 56 shown in FIG. 3 or the like. Thereby, the carrier 11 is attached to the knuckle 30. That is, the carrier 11 is connected to the knuckle 30 at the first attachment part 41 and the second attachment part 42. The first attachment part 41 and the second attachment part 42 fixed to the knuckle 30 in this way are aligned in position in the disc rotation axis direction and the disc radial direction.

Figure 9:
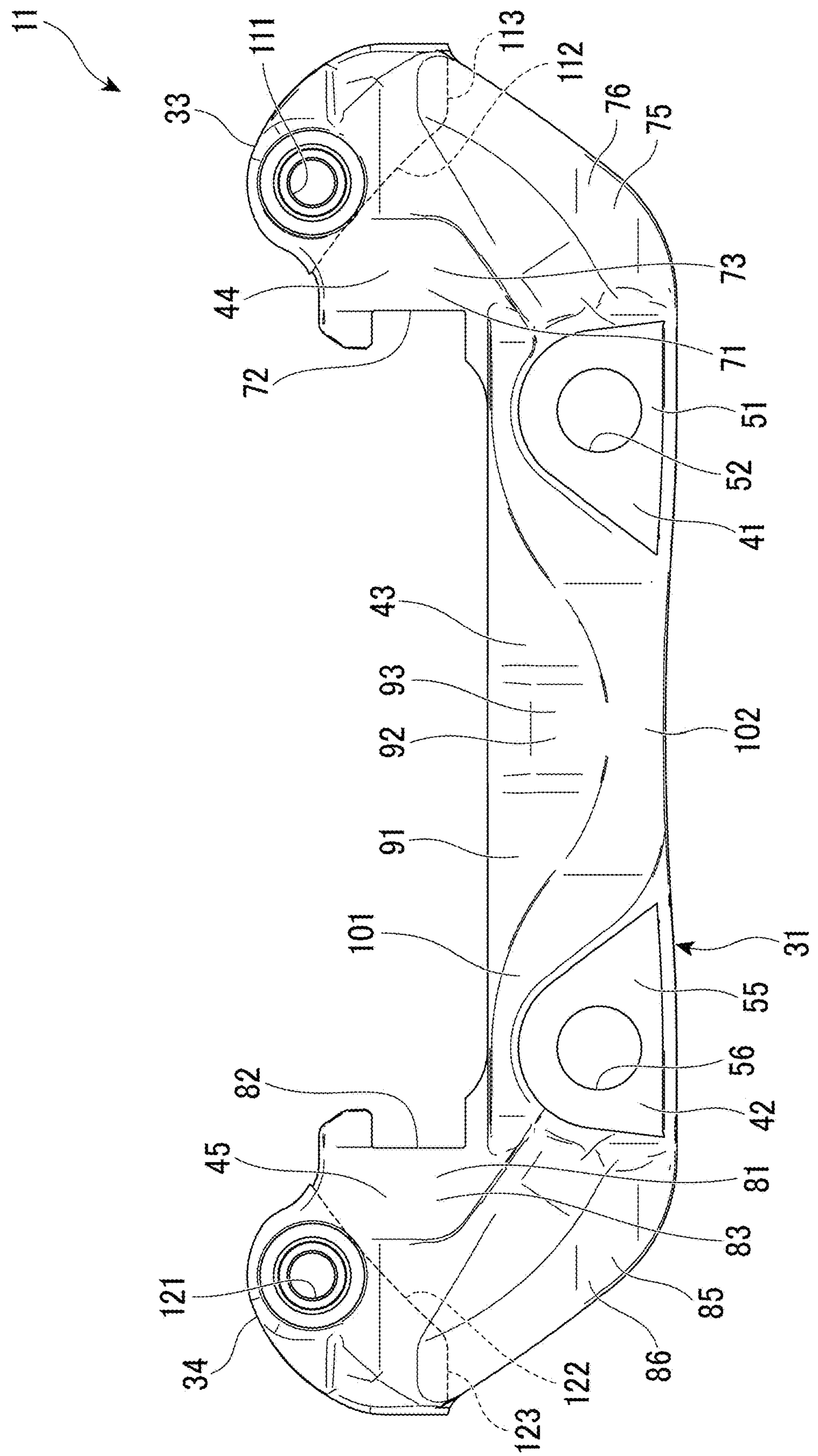
FIG. 9 is a rear view showing the carrier of the disc brake.

As shown in FIGS. 3 to 7, the first inner beam part side extension part 44 overlaps the first attachment part 41 in the disc rotation axis direction. As shown in FIG. 9, the first inner beam part side extension part 44 extends to the disc radially outward side from the first attachment part 41 to be connected to the first arm part 33. As shown in FIGS. 3, 5, and 6, the second inner beam part side extension part 45 overlaps the second attachment part 42 in the disc rotation axis direction. As shown in FIG. 9, the second inner beam part side extension part 45 extends to the disc radially outward side from the second attachment part 42 to be connected to the second arm part 34. In the carrier 11, the first inner beam part side extension part 44 is disposed at an end on the disc rotation exit side, and the second inner beam part side extension part 45 is disposed at an end on the disc rotation entry side.

Figure 4:
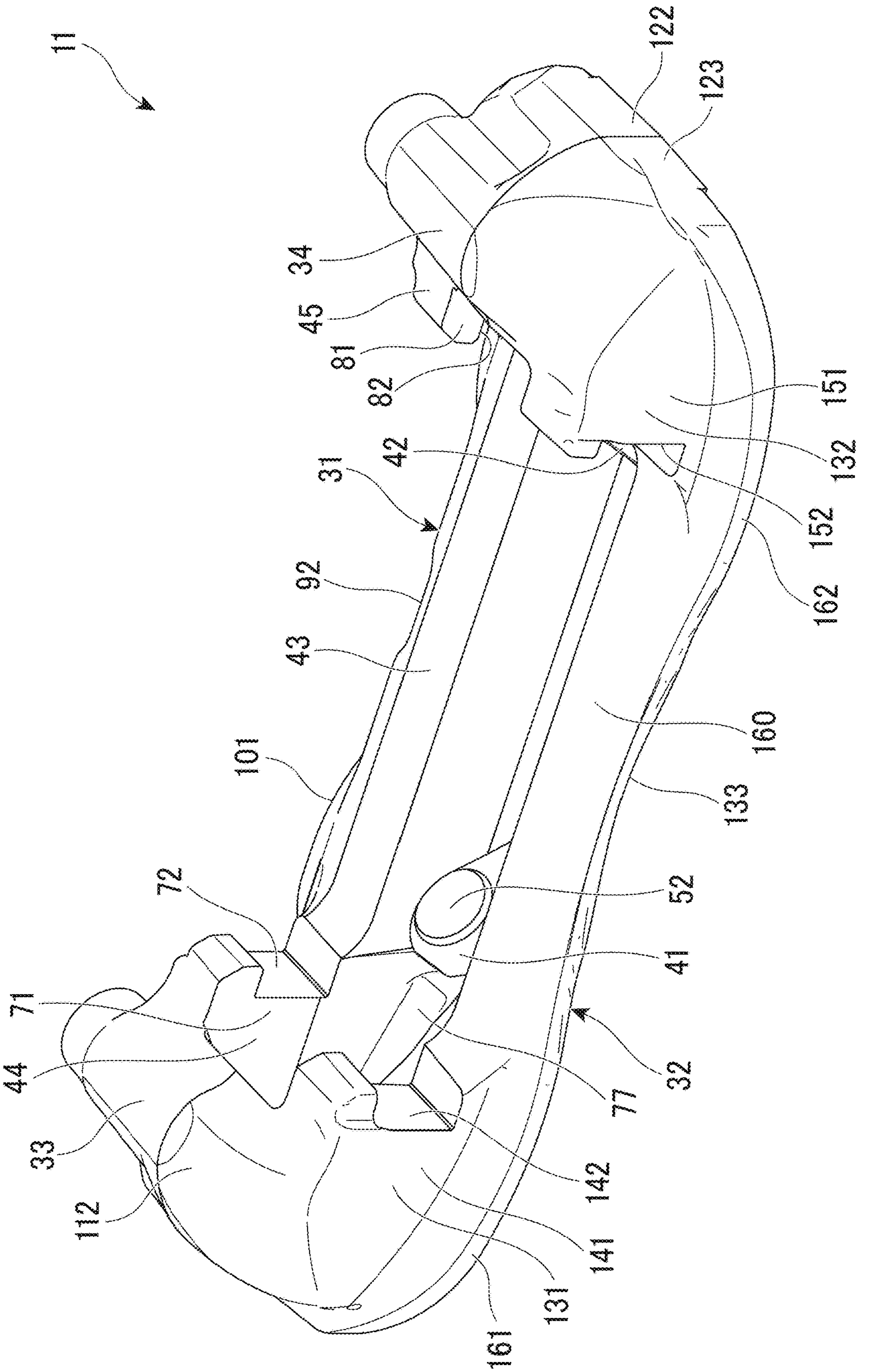
FIG. 4 is a perspective view showing the carrier.

A part of the first inner beam part side extension part 44 on the disc circumferential inward side serves as a first inner beam part side torque receiving part 71 (inner beam part side torque receiving part). A first inner beam part side locking part 72 is formed on the disc circumferential inward side of the first inner beam part side torque receiving part 71. The first inner beam part side locking part 72 has a shape that is recessed to the disc circumferential outward side from a surface of the first inner beam part side extension part 44 on the disc circumferential inward side. As shown in FIGS. 4 and 5, the first inner beam part side locking part 72 penetrates the first inner beam part side torque receiving part 71 in the disc rotation axis direction. In the first inner beam part side torque receiving part 71, a first inner end surface 73 which is on an innermost side in the disc rotation axis direction has a planar shape extending substantially orthogonal to the disc rotation axis while facing the inner side. The first inner end surface 73 is disposed on the inner side with respect to the first attachment surface 51 of the first attachment part 41 in the disc rotation axis direction.

Figure 10:
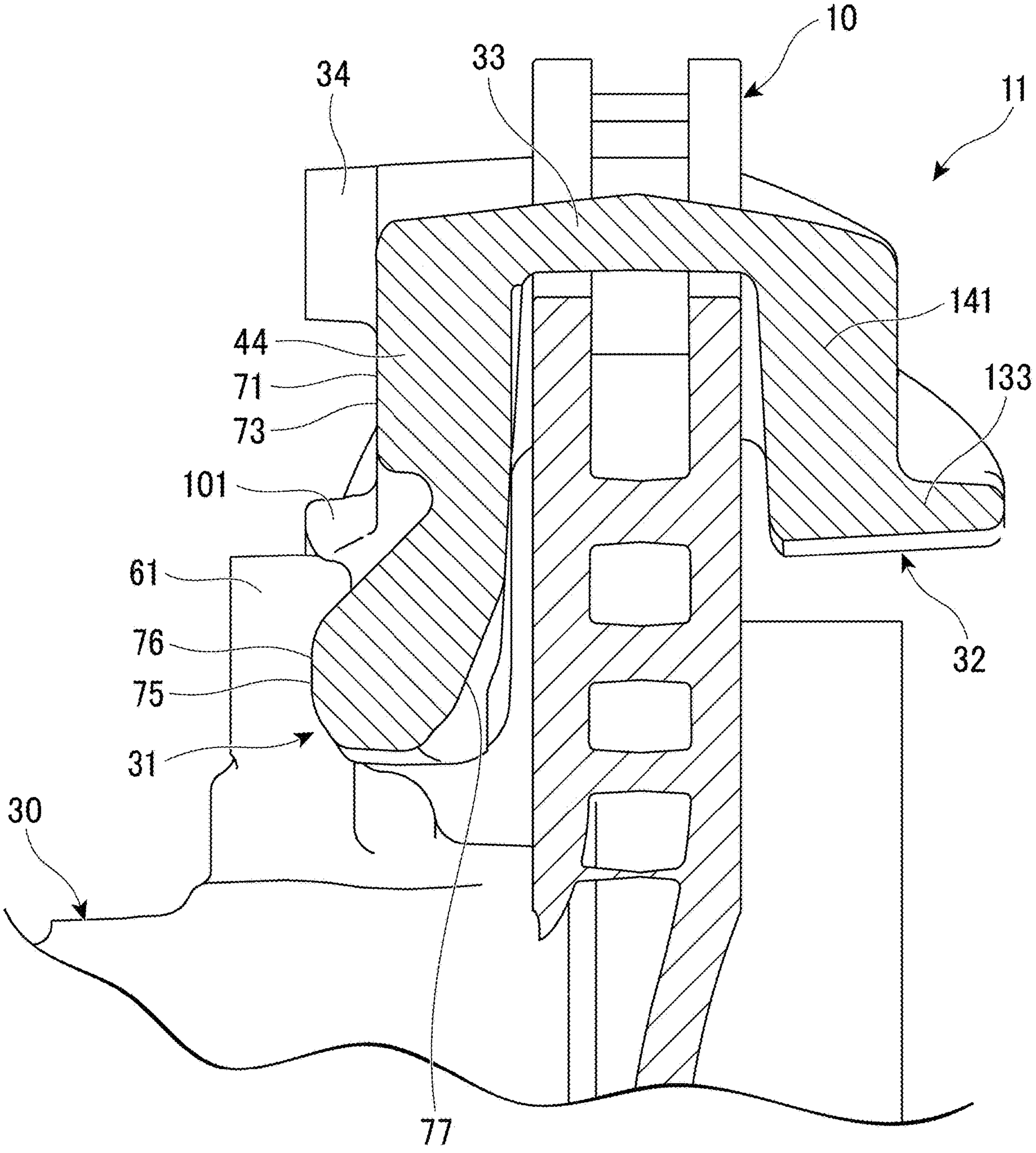
FIG. 10 is a view showing the disc, the carrier, and the knuckle of the disc brake of the embodiment and is a cross-sectional view along line X-X in FIG. 2
Figure 11:
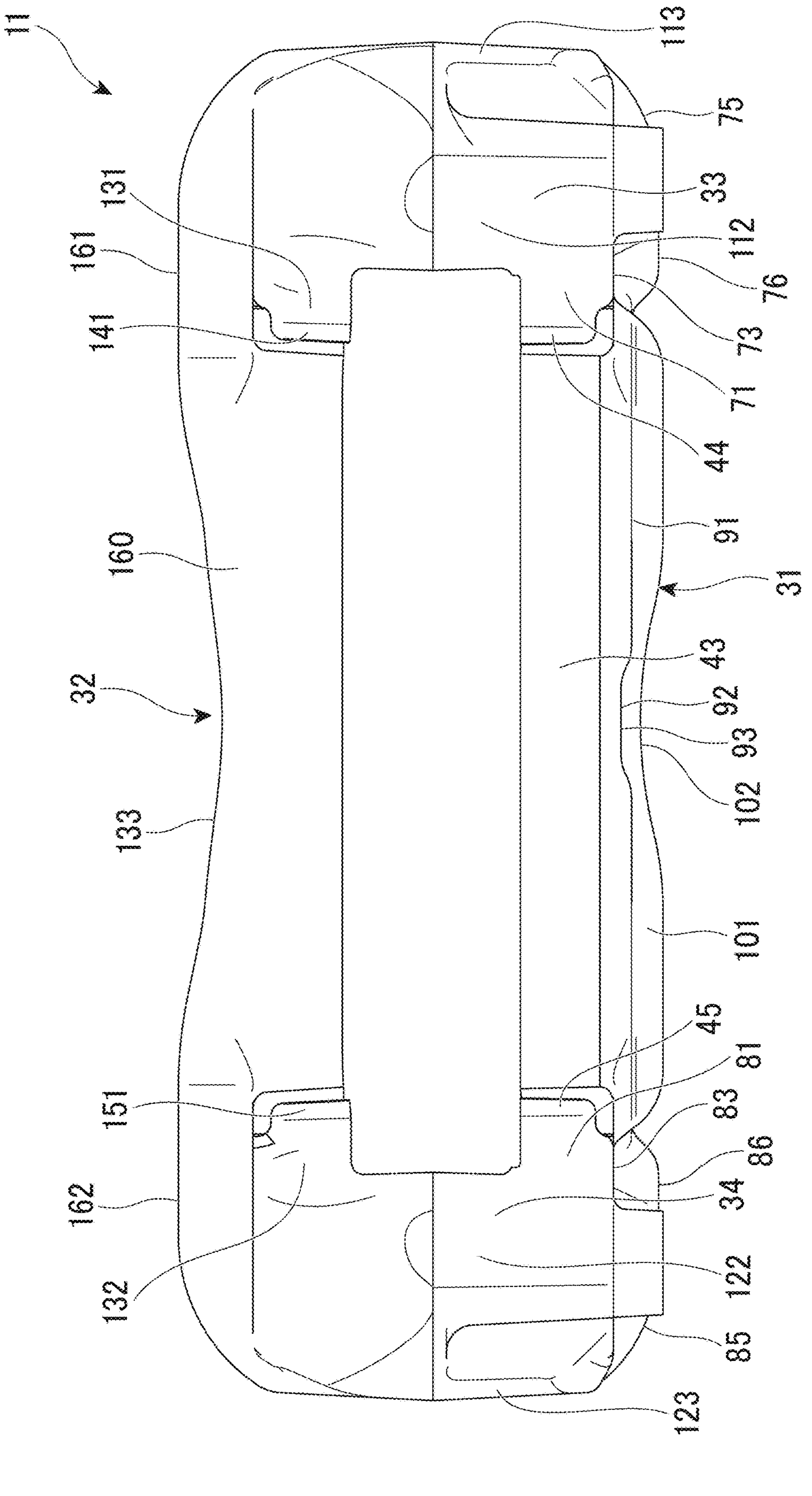
FIG. 11 is a plan view showing the carrier of the disc brake of the embodiment.
Figure 12:
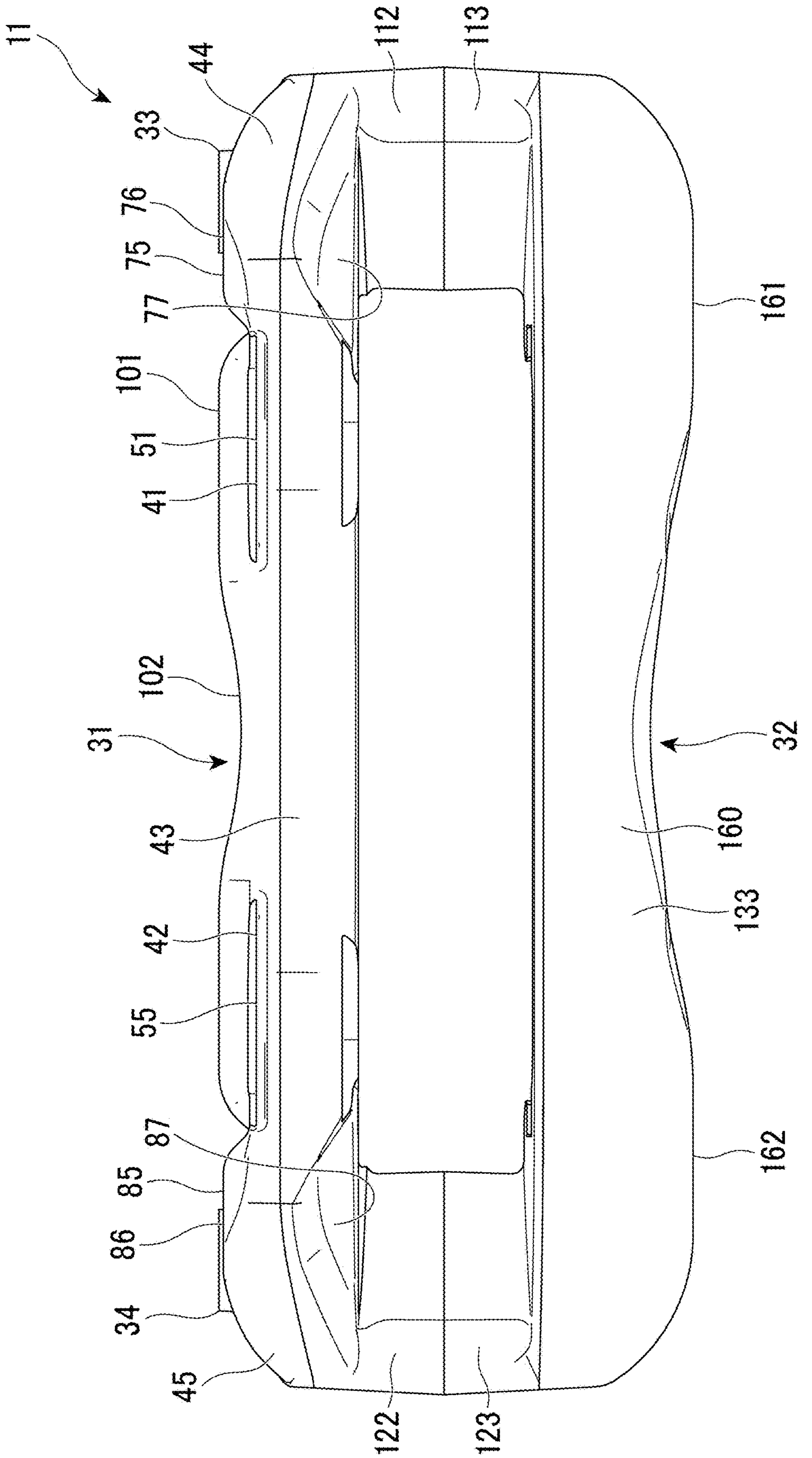
FIG. 12 is a bottom view showing the carrier.
Figure 13:
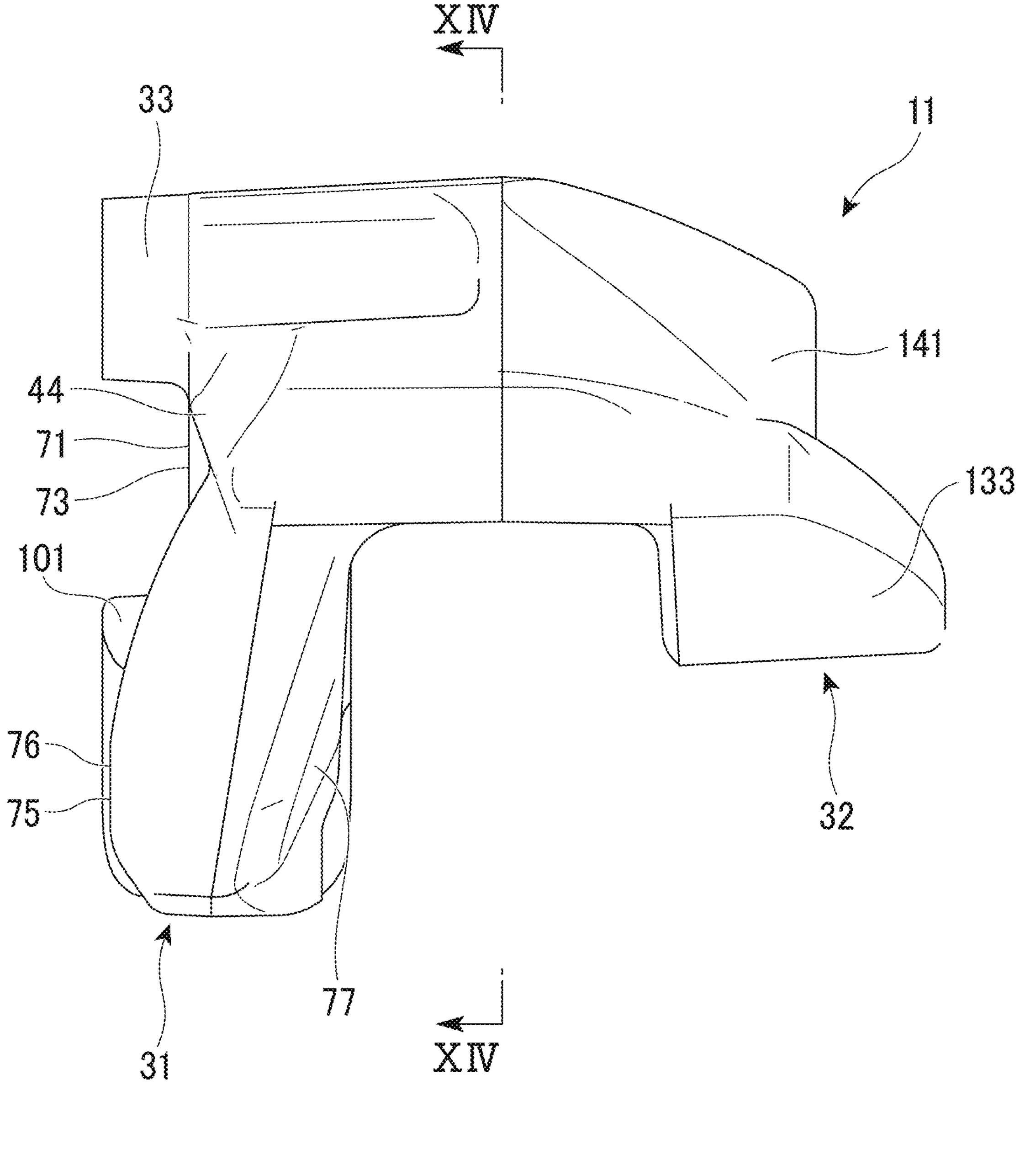
FIG. 13 is a side view showing the carrier.

As shown in FIGS. 3 and 5, a first outward protruding part 75 is provided in the first inner beam part side extension part 44 on the disc circumferential outward side, that is, on the disc rotation exit side. As shown in FIGS. 10 and 11, the first outward protruding part 75 protrudes outward from the first inner end surface 73, that is, toward the inner side in the disc rotation axis direction. As shown in FIG. 12, the first outward protruding part 75 protrudes toward the inner side, that is, toward the knuckle 30 side shown in FIG. 2, with respect to the first attachment surface 51 of the first attachment part 41 in the disc rotation axis direction. As shown in FIGS. 6 and 9, the first outward protruding part 75 is formed to extend along an end edge portion of the first inner beam part side extension part 44 on the disc rotation exit side. The first outward protruding part 75 is formed to extend from an edge of the first attachment surface 51 of the first attachment part 41 on the first inner beam part side extension part 44 side toward the first arm part 33 of the first arm part 33 and the second arm part 34 closer to the first attachment part 41 along the end edge portion of the first inner beam part side extension part 44 on the disc rotation exit side. The first outward protruding part 75 extends such that it becomes further away from the disc radial reference plane toward the disc radially outward side in a direction of the disc radial reference line.

As shown in FIG. 10, a part of the first inner beam part side extension part 44 including the first outward protruding part 75 is a first thick part 76 (thick part) whose thickness (maximum thickness) in the disc rotation axis direction is larger than a thickness (maximum thickness) of the first inner beam part side torque receiving part 71 in the disc rotation axis direction. The first thick part 76 is provided between the first attachment part 41 and the first arm part 33 of the first arm part 33 and the second arm part 34 closer to the first attachment part 41 in the disc circumferential direction orthogonal to the disc radial reference plane.

A first enlarged part 77 (enlarged part) is formed in the first inner beam part side extension part 44 at an edge portion extending in the disc circumferential direction on the disc radially inward side of a back side part facing the disc 10 in the disc rotation axis direction. The first enlarged part 77 is formed such that a gap between itself and the disc 10 becomes larger toward the disc radially inward side, that is, the disc rotation axis. The first enlarged part 77 is formed at an end portion of the inner beam part 31 on the disc rotation exit side as shown in FIGS. 6, 7, 12, and 13. As shown in FIG. 10, the first enlarged part 77 is formed at an end edge portion of the inner beam part 31 on the disc radially inward side in a direction of the disc radial reference line. The gap between the first enlarged part 77 and the disc 10 becomes larger toward the disc radially inward side of the inner beam part 31 in a direction of the disc radial reference line. In other words, the inner beam part 31 includes the first enlarged part 77, which is formed such that the gap between itself and the disc 10 becomes larger toward the disc rotation axis, at the edge portion extending in the disc circumferential direction of the back side part facing the disc 10 in the disc rotation axis direction. The first enlarged part 77 overlaps the first outward protruding part 75 in position in the disc circumferential direction and the disc radial direction. As shown in FIG. 6, the first enlarged part 77 opens toward the disc rotation exit side of the carrier 11 and opens inward in the disc radial direction.

As shown in FIG. 3, a part of the second inner beam part side extension part 45 on the disc circumferential inward side serves as a second inner beam part side torque receiving part 81 (inner beam part side torque receiving part). A second inner beam part side locking part 82 is formed on the disc circumferential inward side of the second inner beam part side torque receiving part 81. The second inner beam part side locking part 82 has a shape that is recessed to the disc circumferential outward side from a surface of the second inner beam part side extension part 45 on the disc circumferential inward side. The second inner beam part side locking part 82 penetrates the second inner beam part side torque receiving part 81 in the disc rotation axis direction. In the second inner beam part side torque receiving part 81, a second inner end surface 83 which is on an innermost side in the disc rotation axis direction has a planar shape extending substantially orthogonal to the disc rotation axis while facing the inner side. The second inner end surface 83 is disposed on the inner side with respect to the second attachment surface 55 of the second attachment part 42 in the disc rotation axis direction. The second inner end surface 83 is disposed substantially on the same plane as the first inner end surface 73.

A second outward protruding part 85 protruding to the inner side with respect to the second inner end surface 83 in the disc rotation axis direction is provided in the second inner beam part side extension part 45 on the disc circumferential outward side, that is, on the disc rotation entry side. The second outward protruding part 85 extends from the second attachment part 42 of the pair of the first attachment part 41 and the second attachment part 42 different from the first attachment part 41 that is closer to the first outward protruding part 75. As shown in FIG. 12, the second outward protruding part 85 protrudes toward the inner side, that is, toward the knuckle 30 side shown in FIG. 2, with respect to the second attachment surface 55 of the second attachment part 42 in the disc rotation axis direction. As shown in FIG. 6, the second outward protruding part 85 is formed to extend along an end edge portion of the second inner beam part side extension part 45 on the disc rotation entry side. As shown in FIG. 9, the second outward protruding part 85 is formed to extend from an edge of the second attachment surface 55 of the second attachment part 42 on the second inner beam part side extension part 45 side toward the second arm part 34 of the first arm part 33 and the second arm part 34 closer to the second attachment part 42 along the end edge portion of the second inner beam part side extension part 45 on the disc rotation entry side. The second outward protruding part 85 extends such that it becomes further away from the disc radial reference plane toward the disc radially outward side in a direction of the disc radial reference line.

A part of the second inner beam part side extension part 45 including the second outward protruding part 85 is a second thick part 86 (thick part) that is mirror symmetrical with the first thick part 76. Therefore, the second thick part 86 has a thickness (maximum thickness) in the disc rotation axis direction that is larger than a thickness (maximum thickness) of the second inner beam part side torque receiving part 81 in the disc rotation axis direction. The second thick part 86 is provided between the second attachment part 42 and the second arm part 34 of the first arm part 33 and the second arm part 34 closer to the second attachment part 42 in the disc circumferential direction orthogonal to the disc radial reference plane.

Figure 7:
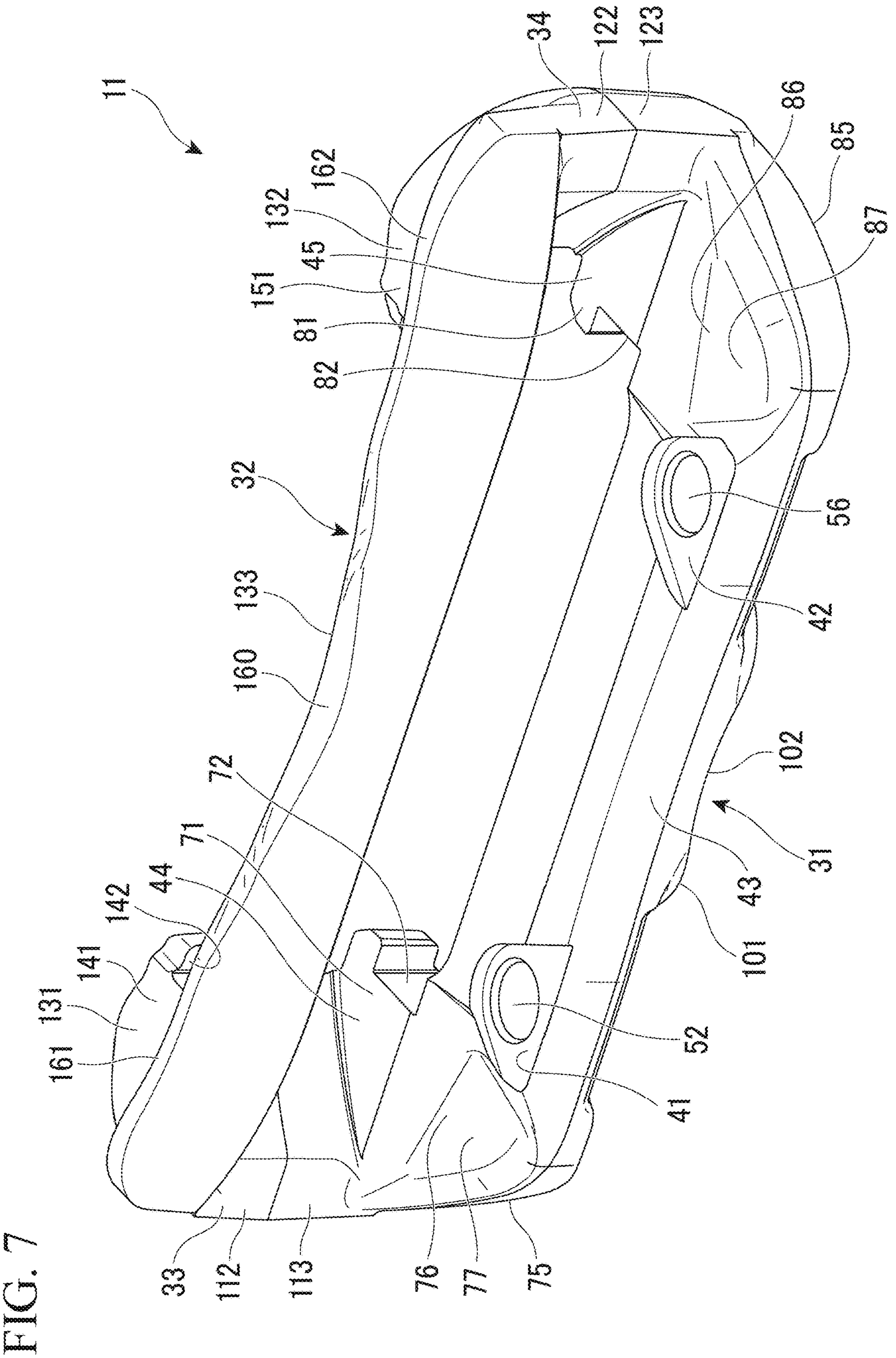
FIG. 7 is a perspective view showing the carrier.

As shown in FIGS. 6 and 7, a second enlarged part 87 (enlarged part) is formed in the second inner beam part side extension part 45 at an edge portion extending in the disc circumferential direction on the disc radially inward side of the back side part facing the disc 10 in the disc rotation axis direction. The second enlarged part 87 is mirror symmetrical with the first enlarged part 77. Therefore, the second enlarged part 87 is formed such that a gap between itself and the disc 10 becomes larger toward the disc radially inward side, that is, the disc rotation axis. The second enlarged part 87 is formed at an end portion of the inner beam part 31 on the disc rotation entry side. The second enlarged part 87 is formed at an end edge portion of the inner beam part 31 on the disc radially inward side in a direction of the disc radial reference line. The gap between the second enlarged part 87 and the disc 10 becomes larger toward the disc radially inward side of the inner beam part 31 in a direction of the disc radial reference line. In other words, the inner beam part 31 includes the second enlarged part 87, which is formed such that the gap between itself and the disc 10 becomes larger toward the disc rotation axis, at the edge portion extending in the disc circumferential direction of the back side part facing the disc 10 in the disc rotation axis direction. The second enlarged part 87 overlaps the second outward protruding part 85 in position in the disc circumferential direction and the disc radial direction. The second enlarged part 87 opens toward the disc rotation entry side of the carrier 11 and opens inward in the disc radial direction.

The first inner beam part side extension part 44 and the second inner beam part side extension part 45 are mirror symmetrical.

The first inner beam part side locking part 72 and the second inner beam part side locking part 82 shown in FIGS. 7 and 9 are mirror symmetrical. The first inner beam part side locking part 72 and the second inner beam part side locking part 82 are aligned with each other in position in the disc rotation axis direction. The first inner beam part side locking part 72 and the second inner beam part side locking part 82 are aligned with each other in a direction of the disc radial reference line. The first inner beam part side locking part 72 and the second inner beam part side locking part 82 face each other in the disc circumferential direction.

The first outward protruding part 75 and the second outward protruding part 85 shown in FIGS. 6 and 9 are mirror symmetrical. The first outward protruding part 75 and the second outward protruding part 85 are aligned with each other in position in the disc rotation axis direction. The first outward protruding part 75 and the second outward protruding part 85 are aligned with each other in position in a direction of the disc radial reference line. The first outward protruding part 75 and the second outward protruding part 85 are spaced apart in the disc circumferential direction. Therefore, the first outward protruding part 75 and the second outward protruding part 85 have the same protrusion height in the disc rotation axis direction from the first attachment surface 51 and the second attachment surface 55 disposed on the same plane.

The first enlarged part 77 and the second enlarged part 87 are mirror symmetrical. The first enlarged part 77 and the second enlarged part 87 are aligned with each other in position in the disc rotation axis direction. The first enlarged part 77 and the second enlarged part 87 are aligned with each other in position in a direction of the disc radial reference line. The first enlarged part 77 and the second enlarged part 87 are spaced apart in the disc circumferential direction.

As shown in FIG. 9, the first attachment part 41 and the second attachment part 42 are provided inside the pair of the first inner beam part side torque receiving part 71 and the second inner beam part side torque receiving part 81 in the disc radial direction. In other words, the pair of the first attachment part 41 and the second attachment part 42 are provided on a side in a disc center direction, which is a side toward a center of rotation of the disc 10, with respect to the pair of the first inner beam part side torque receiving part 71 and the second inner beam part side torque receiving part 81. The pair of the first inner beam part side torque receiving part 71 and the second inner beam part side torque receiving part 81 are provided inside the pair of the first arm part 33 and second arm part 34 in the disc radial direction. The pair of the first inner beam part side torque receiving part 71 and the second inner beam part side torque receiving part 81 are provided on both sides of the carrier 11 in the disc circumferential direction. The first attachment part 41 is disposed at a position overlapping the first inner beam part side torque receiving part 71 in the disc circumferential direction. The second attachment part 42 is disposed at a position overlapping the second inner beam part side torque receiving part 81 in the disc circumferential direction. The first attachment part 41 is disposed at a position overlapping the first inner beam part side torque receiving part 71 also in a direction orthogonal to the disc radial reference plane. The second attachment part 42 is disposed at a position overlapping the second inner beam part side torque receiving part 81 also in a direction orthogonal to the disc radial reference plane.

As shown in FIGS. 3, 5, and 6, the inner connection part 43 extends in the disc circumferential direction to connect the first attachment part 41 and the second attachment part 42. The inner connection part 43 overlaps the first attachment part 41 and the second attachment part 42 in position in the disc rotation axis direction. The inner connection part 43 has a main surface part 91 facing toward the inner side in the disc rotation axis direction at a portion in the middle in the disc circumferential direction and on the disc radially outward side. The main surface part 91 has a planar shape extending substantially orthogonal to the disc rotation axis.

The inner connection part 43 includes a central recessed part 92 that is recessed to the outer side from the main surface part 91 in the disc rotation axis direction at a center position of the main surface part 91 in the disc circumferential direction. The central recessed part 92 is at a center of the carrier 11 in the disc circumferential direction. In the central recessed part 92, a bottom surface 93 on a back side in a recess direction thereof has a planar shape extending orthogonal to the disc rotation axis. The central recessed part 92 is provided at a position that does not overlap either the first attachment hole 52 of the first attachment part 41 or the second attachment hole 56 of the second attachment part 42 in the disc circumferential direction. In other words, the entire central recessed part 92 is provided offset from both the first attachment hole 52 and the second attachment hole 56 in the disc circumferential direction. The entire central recessed part 92 is provided offset from both the first attachment part 41 and the second attachment part 42 in the disc circumferential direction. The inner connection part 43 has a mirror-symmetrical shape.

The inner beam part 31 has a central convex part 101 that extends to connect the first inner beam part side extension part 44, the inner connection part 43, and the second inner beam part side extension part 45. The central convex part 101 is disposed inside the main surface part 91 of the inner connection part 43 in the disc radial direction. The central convex part 101 is disposed on an outer side of the first attachment part 41 and the second attachment part 42 in the disc radial direction. The central convex part 101 protrudes to the inner side in the disc rotation axis direction, that is, to the knuckle 30 side, with respect to the main surface part 91 of the inner connection part 43. The central convex part 101 protrudes to the inner side in the disc rotation axis direction, that is, to the knuckle 30 side, with respect to the first attachment surface 51 of the first attachment part 41 and the second attachment surface 55 of the second attachment part 42.

The central convex part 101 is formed to extend to continuously connect an edge of the first attachment surface 51 of the first attachment part 41 on the disc radially outward side, an edge of the inner connection part 43 on the disc radially inward side, and an edge of the second attachment surface 55 of the second attachment part 42 on the disc radially outward side. Therefore, the inner beam part 31 includes the central convex part 101 provided across the pair of the first attachment part 41 and the second attachment part 42 in the disc circumferential direction, provided inside the inner beam part 31 in the disc radial direction, and protruding to the knuckle 30 side with respect to the pair of the first attachment part 41 and the second attachment part 42 in the disc rotation axis direction.

The central convex part 101 extends from the center of the carrier 11 toward a portion between the first attachment part 41 and the first inner beam part side torque receiving part 71 in the disc circumferential direction. The central convex part 101 is provided to overlap the first attachment hole 52 of the first attachment part 41 in position in the disc circumferential direction. Also, the central convex part 101 extends from the center of the carrier 11 to a portion between the second attachment part 42 and the second inner beam part side torque receiving part 81 in the disc circumferential direction. The central convex part 101 is provided to overlap the second attachment hole 56 of the second attachment part 42 in position in the disc circumferential direction.

The central convex part 101 includes an outward concave part 102 provided at a center position in the disc circumferential direction. As shown in FIG. 11, the outward concave part 102 is recessed to the outer side from end surfaces on the inner side in the disc rotation axis direction of both side portions of the outward concave part 102 in the disc circumferential direction of the central convex part 101. However, the entire outward concave part 102 is provided on the inner side in the disc rotation axis direction with respect to the main surface part 91 of the inner connection part 43. The outward concave part 102 is provided between the first outward protruding part 75 and the second outward protruding part 85 of the central convex part 101 in the disc circumferential direction. In other words, the outward concave part 102 recessed in the disc rotation axis direction is provided in the central convex part 101 inside the first outward protruding part 75 and inside the second outward protruding part 85 in the disc circumferential direction. The central convex part 101 has a mirror-symmetrical shape.

As shown in FIGS. 3, 5, and 6, the central recessed part 92 of the inner connection part 43 is provided outside the central convex part 101 in the disc radial direction. Therefore, the inner beam part 31 includes the central recessed part 92 recessed in the disc rotation axis direction outside the central convex part 101 in the disc radial direction.

As described above, the inner beam part 31 includes the pair of the first inner beam part side torque receiving part 71 and the second inner beam part side torque receiving part 81, the pair of the first attachment part 41 and the second attachment part 42, the pair of the first outward protruding part 75 and the second outward protruding part 85, and the pair of the first thick part 76 and the second thick part 86. The pair of the first attachment part 41 and the second attachment part 42 are disposed at positions overlapping the pair of the first inner beam part side torque receiving part 71 and the second inner beam part side torque receiving part 81 in the disc circumferential direction, respectively.

As shown in FIG. 3, the first arm part 33 extends in the disc rotation axis direction from an end portion of the first inner beam part side extension part 44 on the disc radially outward side toward the outer side. As shown in FIG. 10, the first arm part 33 crosses the disc 10 in the disc rotation axis direction on the disc radially outward side of an outer circumferential surface thereof. As shown in FIGS. 3, 5, and 6, the first arm part 33 also protrudes from the first inner beam part side extension part 44 to the inner side in the disc rotation axis direction. The first arm part 33 extends to straddle the outer circumferential side of the disc 10 in the disc rotation axis direction and is connected to the inner beam part 31.

A first caliper support hole 111 extending in the disc rotation axis direction is formed in the first arm part 33. The first caliper support hole 111 is formed from an end surface of the first arm part 33 on the inner side to an intermediate position inside the first arm part 33.

As shown in FIG. 9, the first outward protruding part 75 is provided further outward from the first caliper support hole 111 in the disc circumferential direction as it approaches the first caliper support hole 111, which is provided in the first arm part 33 of the pair of the first arm part 33 and second arm part 34 closer to the first attachment part 41, in the disc radial direction.

Figure 14:
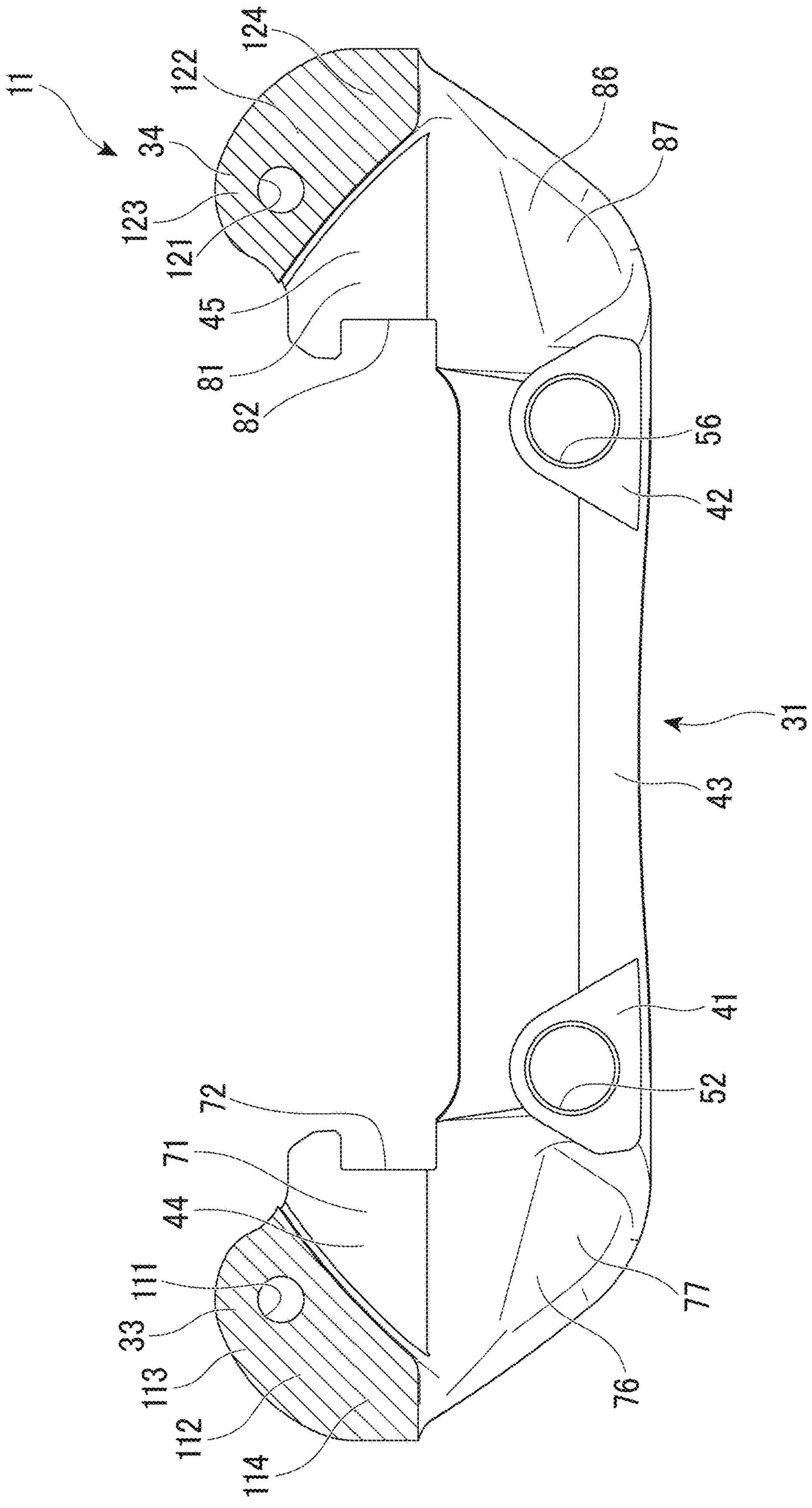
FIG. 14 is a cross-sectional view along line XIV-XIV in FIG. 13 showing the carrier.

A portion of the first arm part 33 between the inner beam part 31 and the outer beam part 32 in the disc rotation axis direction is a first intermediate part 112 shown in FIG. 14. In other words, the first intermediate part 112 connects the inner beam part 31 and the outer beam part 32. The first caliper support hole 111 is formed inside the first intermediate part 112. The first intermediate part 112 has a first intermediate main body part 113 in which the first caliper support hole 111 is formed, and a first arm intermediate reinforcing part 114 provided at a portion outside the first intermediate main body part 113 in the disc circumferential direction. An equidistant range of the first intermediate part 112 from the first caliper support hole 111 to the inward and outward sides in the disc circumferential direction is the first intermediate main body part 113. When the first arm intermediate reinforcing part 114 is formed, the first intermediate part 112 has a larger length on an outer side from the first caliper support hole 111 than on an inner side from the first caliper support hole 111 in the disc circumferential direction. As shown in FIG. 9, the first arm intermediate reinforcing part 114 is provided to extend from the first caliper support hole 111 to a position at which it overlaps the first outward protruding part 75 in the disc circumferential direction. The first arm intermediate reinforcing part 114 also overlaps the first inner beam part side locking part 72 in position in a direction of the disc radial reference line.

At least a part of the first outward protruding part 75 is provided at a position overlapping the first arm intermediate reinforcing part 114 when viewed from the disc rotation axis direction. Specifically, when viewed from the disc rotation axis direction, an end portion of the first outward protruding part 75 on the disc radially outward side and an end portion of the first arm intermediate reinforcing part 114 on the disc circumferential outward side, that is, the disc rotation exit side, overlap each other. In other words, the end portion of the first outward protruding part 75 on the disc radially outward side and the end portion of the first arm intermediate reinforcing part 114 on the disc rotation exit side overlap in position in the disc circumferential direction and overlap in position in the disc radial direction. When viewed from the disc rotation axis direction, the first thick part 76 including the first outward protruding part 75 is provided at a position overlapping the first arm intermediate reinforcing part 114 that is a part of the first arm part 33.

As shown in FIG. 3, the second arm part 34 extends in the disc rotation axis direction from an end portion of the second inner beam part side extension part 45 on the disc radially outward side toward the outer side. Similarly to the first arm part 33, the second arm part 34 also crosses the disc 10 in the disc rotation axis direction on the disc radially outward side of an outer circumferential surface thereof. The second arm part 34 also protrudes from the second inner beam part side extension part 45 to the inner side in the disc rotation axis direction. The second arm part 34 extends to straddle the outer circumferential side of the disc 10 in the disc rotation axis direction and is connected to the inner beam part 31.

A second caliper support hole 121 extending in the disc rotation axis direction is formed in the second arm part 34. The second caliper support hole 121 is formed from an end surface of the second arm part 34 on the inner side to an intermediate position inside the second arm part 34.

As shown in FIG. 9, the second outward protruding part 85 is provided further outward from the second caliper support hole 121 in the disc circumferential direction as it approaches the second caliper support hole 121, which is provided in the second arm part 34 of the pair of the first arm part 33 and second arm part 34 closer to the second attachment part 42, in the disc radial direction.

A portion of the second arm part 34 between the inner beam part 31 and the outer beam part 32 in the disc rotation axis direction is a second intermediate part 122 shown in FIG. 14. In other words, the second intermediate part 122 connects the inner beam part 31 and the outer beam part 32. The second caliper support hole 121 is formed inside the second intermediate part 122. The second intermediate part 122 has a second intermediate main body part 123 in which the second caliper support hole 121 is formed, and a second arm intermediate reinforcing part 124 provided at a portion outside the second intermediate main body part 123 in the disc circumferential direction. An equidistant range of the second intermediate part 122 from the second caliper support hole 121 to the inward and outward sides in the disc circumferential direction is the second intermediate main body part 123. When the second arm intermediate reinforcing part 124 is formed, the second intermediate part 122 has a larger length on an outer side from the second caliper support hole 121 than on an inner side from the second caliper support hole 121 in the disc circumferential direction. As shown in FIG. 9, the second arm intermediate reinforcing part 124 is provided to extend from the second caliper support hole 121 to a position at which it overlaps the second outward protruding part 85 in the disc circumferential direction. The second arm intermediate reinforcing part 124 also overlaps the second inner beam part side locking part 82 in position in a direction of the disc radial reference line.

At least a part of the second outward protruding part 85 is provided at a position overlapping the second arm intermediate reinforcing part 124 when viewed from the disc rotation axis direction. Specifically, when viewed from the disc rotation axis direction, an end portion of the second outward protruding part 85 on the disc radially outward side and an end portion of the second arm intermediate reinforcing part 124 on the disc circumferential outward side, that is, the disc rotation entry side, overlap each other. In other words, the end portion of the second outward protruding part 85 on the disc radially outward side and the end portion of the second arm intermediate reinforcing part 124 on the disc rotation entry side overlap in position in the disc circumferential direction and overlap in position in the disc radial direction. When viewed from the disc rotation axis direction, the second thick part 86 including the second outward protruding part 85 is provided at a position overlapping the second arm intermediate reinforcing part 124 that is a part of the second arm part 34.

As shown in FIGS. 8 and 10, the outer beam part 32 is provided at a position facing the inner beam part 31 with the disc 10 interposed therebetween. As shown in FIG. 4, the outer beam part 32 is connected to the inner beam part 31 via the first arm part 33 and the second arm part 34. The outer beam part 32 is formed to extend in the disc circumferential direction.

The outer beam part 32 includes a first outer beam part side extension part 131 extending from the first arm part 33, a second outer beam part side extension part 132 extending from the second arm part 34, and an outer connection part 133 connecting the first outer beam part side extension part 131 and the second outer beam part side extension part 132. The first outer beam part side extension part 131, the second outer beam part side extension part 132, and the outer connection part 133 are all disposed on the outer side with respect to the disc 10. The first outer beam part side extension part 131, the second outer beam part side extension part 132, and the outer connection part 133 all face a surface of the disc 10 on the outer side in the disc rotation axis direction.

The first outer beam part side extension part 131 extends inward in the disc radial direction from an end portion of the first arm part 33 on the outer side in the disc rotation axis direction. The second outer beam part side extension part 132 extends inward in the disc radial direction from an end portion the second arm part 34 on the outer side in the disc rotation axis direction. The first outer beam part side extension part 131 is disposed on the disc rotation exit side with respect to the second outer beam part side extension part 132. The outer connection part 133 connects end portions on the disc radially inward side of the first outer beam part side extension part 131 and the second outer beam part side extension part 132. The outer connection part 133 extends in the disc circumferential direction.

A portion of the first outer beam part side extension part 131 on the disc circumferential inward side is a first outer beam part side torque receiving part 141. A first outer beam part side locking part 142 similar to the first inner beam part side locking part 72 is formed in the first outer beam part side torque receiving part 141. The first outer beam part side locking part 142 has a shape that is recessed to the disc circumferential outward side from a surface of the first outer beam part side extension part 131 on the disc circumferential inward side. The first outer beam part side locking part 142 penetrates the first outer beam part side torque receiving part 141 in the disc rotation axis direction. The first outer beam part side locking part 142 is aligned with the first inner beam part side locking part 72 in position in the disc radial direction and the disc circumferential direction.

As shown in FIG. 3, a portion of the second outer beam part side extension part 132 on the disc circumferential inward side is a second outer beam part side torque receiving part 151. A second outer beam part side locking part 152 similar to the second inner beam part side locking part 82 is formed in the second outer beam part side torque receiving part 151 on the disc circumferential inward side. The second outer beam part side locking part 152 has a shape that is recessed to the disc circumferential outward side from a surface of the second outer beam part side extension part 132 on the disc circumferential inward side. The second outer beam part side locking part 152 penetrates the second outer beam part side torque receiving part 151 in the disc rotation axis direction. The second outer beam part side locking part 152 is aligned with the second inner beam part side locking part 82 in position in the disc radial direction and the disc circumferential direction.

The first outer beam part side locking part 142 and the second outer beam part side locking part 152 are aligned with each other in position in the disc rotation axis direction. The first outer beam part side locking part 142 and the second outer beam part side locking part 152 are aligned with each other in position in a direction of the disc radial reference line. The first outer beam part side locking part 142 and the second outer beam part side locking part 152 face each other in the disc circumferential direction. The first outer beam part side extension part 131 and the second outer beam part side extension part 132 are mirror symmetrical. The first outer beam part side locking part 142 and the second outer beam part side locking part 152 are mirror symmetrical.

As shown in FIG. 11, the outer connection part 133 includes a main body part 160 connecting the first outer beam part side extension part 131 and the second outer beam part side extension part 132. Also, the outer connection part 133 includes a first outer beam protruding part 161 (outer beam protruding part) protruding to the outer side in the disc rotation axis direction with respect to the main body part 160 on the disc rotation exit side. The first outer beam protruding part 161 is provided at a position overlapping the first outward protruding part 75 of the inner beam part 31 when viewed in the disc rotation axis direction. In other words, the first outer beam protruding part 161 and the first outward protruding part 75 overlap in position in the disc circumferential direction and overlap in position in the disc radial direction.

The outer connection part 133 includes a second outer beam protruding part 162 (outer beam protruding part) protruding to the outer side in the disc rotation axis direction with respect to the main body part 160 on the disc rotation entry side. The second outer beam protruding part 162 is provided at a position overlapping the second outward protruding part 85 of the inner beam part 31 when viewed in the disc rotation axis direction. In other words, the second outer beam protruding part 162 and the second outward protruding part 85 overlap in position in the disc circumferential direction and overlap in position in the disc radial direction.

As described above, the outer beam part 32 includes a pair of the first outer beam part side torque receiving part 141 and the second outer beam part side torque receiving part 151 on both sides in the disc circumferential direction. Also, the outer beam part 32 includes the first outer beam protruding part 161 and the second outer beam protruding part 162 on both sides in the disc circumferential direction. The first outer beam protruding part 161 is provided at a position overlapping the first outward protruding part 75 when viewed in the disc rotation axis direction and protrudes in a direction away from the first outward protruding part 75 in the disc rotation axis direction. The second outer beam protruding part 162 is provided at a position overlapping the second outward protruding part 85 when viewed in the disc rotation axis direction and protrudes in a direction away from the second outward protruding part 85 in the disc rotation axis direction.

As shown in FIG. 2, in the carrier 11, the inner beam part 31 supports the first friction pad 23 with the first inner beam part side locking part 72 provided on the first inner beam part side extension part 44 and the second inner beam part side locking part 82 provided on the second inner beam part side extension part 45. Also, as shown in FIG. 1, in the carrier 11, the outer beam part 32 supports the second friction pad 27 with the first outer beam part side locking part 142 provided on the first outer beam part side extension part 131 and the second outer beam part side locking part 152 provided on the second outer beam part side extension part 132.

In the carrier 11, the first attachment part 41 shown in FIG. 2, the first inner beam part side extension part 44, the first arm part 33, and the first outer beam part side extension part 131 shown in FIG. 1 are disposed on the disc rotation exit side. In the carrier 11, the second attachment part 42 shown in FIG. 2, the second inner beam part side extension part 45, the second arm part 34, and the second outer beam part side extension part 132 shown in FIG. 1 are disposed on the disc rotation entry side.

The first friction pad 23 on the inner side shown in FIG. 2 and the second friction pad 27 on the outer side shown in FIG. 1 are parts having substantially the same shape. Both the first friction pad 23 and the second friction pad 27 have a back plate 181. Both the first friction pad 23 and the second friction pad 27 have a lining (not shown). The lining (not shown) is attached to one surface side of the back plate 181 in the thickness direction.

The back plate 181 of the first friction pad 23 on the inner side and the back plate 181 of the second friction pad 27 on the outer side are common parts having the same shape. The back plate 181 includes a main plate part 185 and a pair of lug parts 186 protruding in directions opposite to each other in the disc circumferential direction from both end portions in the disc circumferential direction of the main plate part 185. The lining (not shown) is attached to the main plate part 185 of the back plate 181.

As shown in FIG. 2, the first inner beam part side pad spring 21 is attached to the recess-shaped first inner beam part side locking part 72 of the carrier 11. The second inner beam part side pad spring 22 is attached to the recess-shaped second inner beam part side locking part 82 of the carrier 11. As shown in FIG. 1, the first outer beam part side pad spring 25 is attached to the recess-shaped first outer beam part side locking part 142 of the carrier 11. The second outer beam part side pad spring 26 is attached to the recess-shaped second outer beam part side locking part 152 of the carrier 11.

The first friction pad 23 on the inner side shown in FIG. 2 is in a state in which the lining (not shown) is made to face the surface of the disc 10 on the inner side. In this state, the first friction pad 23 is configured such that the lug part 186 of the back plate 181 on the disc rotation exit side is inserted into the first inner beam part side locking part 72 of the first inner beam part side torque receiving part 71 via the first inner beam part side pad spring 21. Also, in the first friction pad 23 on the inner side, the lug part 186 of the back plate 181 on the disc rotation entry side is inserted into the second inner beam part side locking part 82 of the second inner beam part side torque receiving part 81 via the second inner beam part side pad spring 22. In other words, the pair of lug parts 186 provided on the first friction pad 23 of the pair of the first friction pad 23 and the second friction pad 27 are respectively housed in the pair of the first inner beam part side torque receiving part 71 and the second inner beam part side torque receiving part 81. In yet other words, the pair of lug parts 186 provided on the first friction pad 23 are respectively placed in the pair of the first inner beam part side torque receiving part 71 and the second inner beam part side torque receiving part 81. Thereby, the first friction pad 23 is supported by the carrier 11 via the first inner beam part side pad spring 21 and the second inner beam part side pad spring 22.

The first friction pad 23 supported by the carrier 11 in this way is restricted in movement with respect to the carrier 11 in the disc radial direction and the disc circumferential direction and is allowed in movement with respect to the carrier 11 in the disc rotation axis direction. The first inner beam part side pad spring 21 and the second inner beam part side pad spring 22 guide movement of the first friction pad 23 in the disc rotation axis direction while suppressing rattling. The first inner beam part side torque receiving part 71 receives a braking torque from the first friction pad 23 when the vehicle travels forward and supports the first friction pad 23 to be movable in a disc axial direction. The second inner beam part side torque receiving part 81 receives the braking torque from the first friction pad 23 when the vehicle travels rearward and supports the first friction pad 23 to be movable in the disc axial direction.

The second friction pad 27 on the outer side shown in FIG. 1 is in a state in which the lining (not shown) is made to face the surface of the disc 10 on the outer side. In this state, the second friction pad 27 on the outer side is configured such that the lug part 186 of the back plate 181 on the disc rotation exit side is inserted into the first outer beam part side locking part 142 of the first outer beam part side torque receiving part 141 via the first outer beam part side pad spring 25. Also, in this state, the second friction pad 27 on the outer side is configured such that the lug part 186 of the back plate 181 on the disc rotation entry side is inserted into the second outer beam part side locking part 152 of the second outer beam part side torque receiving part 151 via the second outer beam part side pad spring 26. In other words, the pair of lug parts 186 provided on the second friction pad 27 of the pair of the first friction pad 23 and the second friction pad 27 are respectively housed in the pair of the first outer beam part side torque receiving part 141 and the second outer beam part side torque receiving part 151. In yet other words, the pair of lug parts 186 provided on the second friction pad 27 are respectively placed in the pair of the first outer beam part side torque receiving part 141 and the second outer beam part side torque receiving part 151. Thereby, the second friction pad 27 is supported by the carrier 11 via the first outer beam part side pad spring 25 and the second outer beam part side pad spring 26.

The second friction pad 27 supported by the carrier 11 in this way is restricted in movement with respect to the carrier 11 in the disc radial direction and the disc circumferential direction and is allowed in movement with respect to the carrier 11 in the disc rotation axis direction. The first outer beam part side pad spring 25 and the second outer beam part side pad spring 26 guide movement of the second friction pad 27 in the disc rotation axis direction while suppressing rattling. The first outer beam part side torque receiving part 141 receives a braking torque from the second friction pad 27 when the vehicle travels forward and supports the second friction pad 27 to be movable in the disc axial direction. The second outer beam part side torque receiving part 151 receives the braking torque from the second friction pad 27 when the vehicle travels rearward and supports the second friction pad 27 to be movable in the disc axial direction.

The caliper 12 includes a caliper body 201, a pair of a first slide pin (not shown) and a second slide pin (not shown), and a pair of a first attachment bolt 204 and a second attachment bolt 205 shown in FIG. 2. The first slide pin (not shown) is fixed to the caliper body 201 by the first attachment bolt 204. The second slide pin (not shown) is fixed to the caliper body 201 by the second attachment bolt 205. In the caliper 12, the first slide pin (not shown) is disposed on the disc rotation exit side, and the second slide pin (not shown) is disposed on the disc rotation entry side.

The caliper 12 has a substantially mirror-symmetrical shape. The disc radial reference line and the disc radial reference plane pass through a center position of the caliper 12 in the disc circumferential direction. In the caliper 12, the first slide pin (not shown) and the second slide pin (not shown) are aligned with each other in position in the axial direction and disposed in parallel to be fixed to the caliper body 201.

In the caliper 12, the first slide pin (not shown) is slidably fitted into the first caliper support hole 111 shown in FIG. 3 or the like formed in the first arm part 33 of the carrier 11. Thereby, the first slide pin (not shown) of the caliper 12 shown in FIGS. 1 and 2 is stored in the first arm part 33 to be movable. An axial direction of movement (hereinafter referred to as a movement axial direction) of the first slide pin (not shown) is an axial direction of the first caliper support hole 111 shown in FIG. 3 or the like, and coincides with the disc rotation axis direction.

Also, in the caliper 12 shown in FIGS. 1 and 2, the second slide pin (not shown) is slidably fitted into the second caliper support hole 121 shown in FIG. 3 or the like formed in the second arm part 34 of the carrier 11. Thereby, the second slide pin (not shown) of the caliper 12 shown in FIGS. 1 and 2 is stored in the second arm part 34 to be movable. A movement axial direction of the second slide pin (not shown) is an axial direction of the second caliper support hole 121 shown in FIG. 3 or the like, and coincides with the disc rotation axis direction.

In the caliper 12 shown in FIGS. 1 and 2, the caliper body 201 is slidably supported by the first arm part 33 and the second arm part 34 of the carrier 11 in the disc rotation axis direction via the first slide pin (not shown) and the second slide pin (not shown). In other words, the carrier 11 supports the caliper 12 to be slidable in the disc rotation axis direction at the first arm part 33 and the second arm part 34. Therefore, the caliper 12 is provided on the carrier 11 to be movable in the disc rotation axis direction.

The caliper body 201 has a substantially mirror-symmetrical shape. The disc radial reference line and the disc radial reference plane pass through a center position of the caliper body 201 in the disc circumferential direction. The caliper body 201 includes a cylinder part 211, a bridge part 212, a first pin attachment part 214, and a second pin attachment part 215 shown in FIG. 2, and a claw part 216 shown in FIG. 1.

The cylinder part 211 shown in FIG. 2 is disposed on the inner side of the disc 10 in the disc rotation axis direction. The bridge part 212 extends from a portion of the cylinder part 211 on the disc radially outward side to the outer side in the disc rotation axis direction. The bridge part 212 crosses an outer circumference of the disc 10 in the disc rotation axis direction on the disc radially outward side.

The first pin attachment part 214 and the second pin attachment part 215 are disposed on the inner side of the disc 10 in the disc rotation axis direction. The first pin attachment part 214 extends from the cylinder part 211 to the disc rotation exit side. The second pin attachment part 215 extends from the cylinder part 211 to the disc rotation entry side.

The claw part 216 shown in FIG. 1 extends to the disc radially inward side from an end portion on the outer side of the bridge part 212 in the disc rotation axis direction and is disposed on the outer side of the disc 10.

A piston (not shown) constituting the caliper 12 is housed in the cylinder part 211, shown in FIG. 2, of the caliper body 201. The piston (not shown) is housed in a portion of the cylinder part 211 on the disc 10 side in the disc rotation axis direction to be movable in the disc rotation axis direction. The piston (not shown) faces the surface of the disc 10 on the inner side. The first friction pad 23 is disposed between the surface of the disc 10 on the inner side and the piston (not shown). When the piston (not shown) is directed toward the disc 10 in the disc rotation axis direction, the piston comes into contact with the first friction pad 23 and presses the first friction pad 23 to bring it into contact with the disc 10. The second friction pad 27 is disposed between the surface of the disc 10 on the outer side and the claw part 216 shown in FIG. 1.

In the disc brake 1, a brake fluid is introduced into the cylinder part 211, shown in FIG. 2, of the caliper 12 through a brake pipe (not shown). Then, a brake hydraulic pressure acts on the piston (not shown) in the cylinder part 211. As a result, the piston (not shown) moves forward to the disc 10 side, comes into contact with the first friction pad 23 on the inner side disposed between the piston and the disc 10, and presses the first friction pad 23 toward the disc 10. Then, the first friction pad 23 on the inner side is guided by the carrier 11 via the first inner beam part side pad spring 21 and the second inner beam part side pad spring 22, moves in the disc rotation axis direction, and comes into contact with the surface of the disc 10 on the inner side at the lining (not shown).

Due to a reaction force of this pressing, the caliper body 201 slides the first slide pin (not shown) and the second slide pin (not shown) with respect to the carrier 11 to move in the disc rotation axis direction. Then, the claw part 216 shown in FIG. 1 comes into contact with the second friction pad 27 on the outer side disposed between the claw part 216 and the disc 10 and presses the second friction pad 27 toward the disc 10. Then, the second friction pad 27 on the outer side is guided by the carrier 11 via the first outer beam part side pad spring 25 and the second outer beam part side pad spring 26, moves in the disc rotation axis direction, and comes into contact with the surface of the disc 10 on the outer side at the lining (not shown).

The caliper 12 slidably supported by the carrier 11 in this way sandwiches the pair of the first friction pad 23 and the second friction pad 27 with the piston and the claw part 216 from both sides in the disc rotation axis direction due to an operation of the piston (not shown). In other words, the caliper 12 presses the pair of the first friction pad 23 and the second friction pad 27 toward the disc 10 in the disc rotation axis direction. Then, the caliper 12 presses the first friction pad 23 and the second friction pad 27 against surfaces of the disc 10 on both sides. As a result, the first friction pad 23 and the second friction pad 27 apply frictional resistance to the disc 10 to provide a braking force to the vehicle. In this way, in the disc brake 1, the caliper 12 supported by the carrier 11 presses the first friction pad 23 and the second friction pad 27, both of which are supported by the carrier 11, against the disc 10 to generate the braking force. The caliper 12 is a so-called fist type (slide type) caliper. The carrier 11 movably supports the caliper 12 that provides a braking force to the vehicle in this way.

Patent Document 1 described above discloses a disc brake having a structure in which a carrier is attached to a non-rotating part of a vehicle, and a pair of pads and a caliper are supported by the carrier. Incidentally, in disc brakes, it is required to effectively improve rigidity of the carrier. That is, the carrier is fixed to a knuckle which is a non-rotating part of the vehicle via, for example, fasteners inserted through a pair of attachment holes. However, in Patent Document 1, there is a likelihood that an attachment plate part connecting the pair of attachment holes provided in the carrier will be hollowed outward in a radial direction with respect to a rotation axis of the disc, and a rigidity of the carrier will not be satisfied when, for example, a material of the carrier is changed.

The carrier 11 of the disc brake 1 of the present embodiment includes the inner beam part 31, the first arm part 33, and the second arm part 34. Then, the first arm part 33 and the second arm part 34 extend to straddle the outer circumferential side of the disc 10 in the disc rotation axis direction and are connected to the inner beam part 31 to support the caliper 12. The inner beam part 31 extends in the disc circumferential direction to be connected to the first arm part 33 and the second arm part 34, and is provided at a position facing the knuckle 30. Also, the inner beam part 31 includes the pair of the first inner beam part side torque receiving part 71 and the second inner beam part side torque receiving part 81, the first attachment part 41, the second attachment part 42, and the first outward protruding part 75. The pair of the first inner beam part side torque receiving part 71 and the second inner beam part side torque receiving part 81 are provided inside the first arm part 33 and the second arm part 34 in the disc radial direction. The pair of the first inner beam part side torque receiving part 71 and the second inner beam part side torque receiving part 81 are provided on both sides in the disc circumferential direction. The pair of lug parts 186 provided on the first friction pad 23 are housed in the pair of the first inner beam part side torque receiving part 71 and the second inner beam part side torque receiving part 81, respectively. The first attachment part 41 and the second attachment part 42 are provided inside the pair of the first inner beam part side torque receiving part 71 and the second inner beam part side torque receiving part 81 in the disc radial direction. The first attachment part 41 and the second attachment part 42 are disposed at positions overlapping the pair of the first inner beam part side torque receiving part 71 and the second inner beam part side torque receiving part 81, respectively, in the disc circumferential direction, and are connected to the knuckle 30. The carrier 11 includes the first outward protruding part 75 formed to protrude toward the knuckle 30 with respect to the first attachment surface 51 of the first attachment part 41 in the disc rotation axis direction and extend from an edge of the first attachment surface 51 of the first attachment part 41 toward the first arm part 33 close to the first attachment part 41. A rigidity of the inner beam part 31 of the carrier 11 can be effectively improved by the first outward protruding part 75. Therefore, for example, even if the carrier 11 is made of an aluminum alloy, the rigidity can be secured. That is, an aluminum alloy has a small longitudinal elastic modulus and low rigidity while it is lighter than cast iron, but when the first outward protruding part 75 is formed, the rigidity can be secured even if the carrier 11 is formed of a material with a small longitudinal elastic modulus. Also, since the inner beam part 31 becomes more uneven in shape due to the first outward protruding part 75, a surface area of the carrier 11 becomes larger, an airflow becomes more easily disturbed, and thereby a heat transfer coefficient due to convection is improved. Therefore, a temperature rise of the carrier 11 can be suppressed.

Also, in the carrier 11, the first outward protruding part 75 is provided further outward from the first caliper support hole 111 in the disc circumferential direction as it approaches the first caliper support hole 111, which is provided in the first arm part 33 of the pair of the first arm part 33 and second arm part 34 closer to the first attachment part 41 which is one of the first attachment part 41 and the second attachment part 42, in the disc radial direction. Therefore, the rigidity of the inner beam part 31 of the carrier 11 can be improved more effectively by the first outward protruding part 75.

Also, the first arm part 33 of the carrier 11 has the first arm intermediate reinforcing part 114 provided to extend in the disc circumferential direction from the first caliper support hole 111 provided in the first arm part 33 to a position overlapping the first outward protruding part 75. Therefore, the rigidity of the first arm part 33 of the carrier 11 can be effectively improved. Thereby, it is possible to improve a rigidity against a deformation mode such as twisting of the carrier 11 particularly at the time of receiving the braking torque.

Also, in the carrier 11, at least a part of the first outward protruding part 75 is provided at a position overlapping the first arm intermediate reinforcing part 114 when viewed from the disc rotation axis direction. Therefore, the rigidity of the inner beam part 31 and the first arm part 33 of the carrier 11 can be effectively improved by the first outward protruding part 75 and the first arm intermediate reinforcing part 114.

Also, in the carrier 11, the first outward protruding part 75 is provided on the disc rotation exit side in which the braking torque received by the inner beam part 31 is large. Therefore, the rigidity of the inner beam part 31 of the carrier 11 can be improved more effectively.

Also, the inner beam part 31 of the carrier 11 has the second outward protruding part 85 extending from the second attachment part 42 of the pair of the first attachment part 41 and the second attachment part 42 different from the first attachment part 41 closer to the first outward protruding part 75 toward the second arm part 34 of the pair of the first arm part 33 and second arm part 34 closer to the second attachment part 42 along an edge portion of the inner beam part 31. The second outward protruding part 85 protrudes to the knuckle 30 side with respect to the second attachment part 42 in the disc rotation axis direction. Therefore, the rigidity of the inner beam part 31 of the carrier 11 can be further improved. Also, since the inner beam part 31 becomes even more uneven in shape due to the second outward protruding part 85, a surface area of the carrier 11 becomes larger, an airflow becomes more easily disturbed, and thereby a heat transfer coefficient due to convection is improved. Therefore, a temperature rise of the carrier 11 can be further suppressed. Further, both the first outward protruding part 75 and the second outward protruding part 85 have been provided in the carrier 11, but it is also possible to provide only the first outward protruding part 75 without providing the second outward protruding part 85 instead of providing both the first outward protruding part 75 and the second outward protruding part 85.

Also, in the carrier 11, the second outward protruding part 85 is provided further outward from the second caliper support hole 121 in the disc circumferential direction as it approaches the second caliper support hole 121 provided in the second arm part 34 in the disc radial direction. Therefore, the rigidity of the inner beam part 31 of the carrier 11 can be further improved. Thereby, it is possible to improve a rigidity against the deformation mode such as twisting of the carrier 11 particularly at the time of receiving the braking torque.

Also, in the carrier 11, the second arm part 34 includes the second arm intermediate reinforcing part 124 provided to extend from the second caliper support hole 121 to a position at which it overlaps the second outward protruding part 85 in the disc circumferential direction. Therefore, a rigidity of the second arm part 34 of the carrier 11 can be effectively improved. Further, both the first arm intermediate reinforcing part 114 and the second arm intermediate reinforcing part 124 have been provided in the carrier 11, but it is also possible to provide only the first arm intermediate reinforcing part 114 without providing the second arm intermediate reinforcing part 124 instead of providing both the first arm intermediate reinforcing part 114 and the second arm intermediate reinforcing part 124.

Also, in the carrier 11, at least a part of the second outward protruding part 85 is provided at a position overlapping the second arm intermediate reinforcing part 124 when viewed from the disc rotation axis direction. Therefore, the rigidity of the inner beam part 31 and the second arm part 34 of the carrier 11 can be effectively improved by the second outward protruding part 85 and the second arm intermediate reinforcing part 124.

Also, in the carrier 11, the inner beam part 31 has the central convex part 101 provided across the pair of the first attachment part 41 and the second attachment part 42 in the disc circumferential direction, provided inside the inner beam part 31 in the disc radial direction, and protruding to the knuckle 30 side with respect to the pair of the first attachment part 41 and the second attachment part 42 in the disc rotation axis direction. Therefore, the rigidity of the inner beam part 31 of the carrier 11 can be effectively improved by the central convex part 101. Also, since the inner beam part 31 becomes even more uneven in shape due to the central convex part 101, a surface area of the carrier 11 becomes larger, and an airflow becomes more easily disturbed, and thereby a heat transfer coefficient due to convection is improved. Therefore, a temperature rise of the carrier 11 can be further suppressed.

Also, in the carrier 11, the central convex part 101 is provided to extend toward a portion between the first attachment part 41 and the inner beam part side torque receiving part 71 in the disc circumferential direction, and overlap the first attachment hole 52 of the first attachment part 41 in position in the disc circumferential direction. In addition, the central convex part 101 is provided to extend toward a portion between the second attachment part 42 and the inner beam part side torque receiving part 81 in the disc circumferential direction, and overlap the second attachment hole 56 of the second attachment part 42 in position in the disc circumferential direction. Therefore, the rigidity of the inner beam part 31 of the carrier 11 can be further effectively improved by the central convex part 101. A decrease in the rigidity of the carrier 11 particularly due to formation of the first attachment hole 52 and the second attachment hole 56 can be suppressed by the central convex part 101.

Also, in the carrier 11, the central convex part 101 includes the outward concave part 102 recessed in the disc rotation axis direction inside the first outward protruding part 75 and inside the second outward protruding part 85 in the disc circumferential direction. Therefore, an increase in weight can be suppressed while improving the rigidity of the inner beam part 31 of the carrier 11. Also, since the inner beam part 31 becomes even more uneven in shape due to the outward concave part 102 of the central convex part 101, a surface area of the carrier 11 becomes larger, and an airflow becomes more easily disturbed, and thereby a heat transfer coefficient due to convection is improved. Therefore, a temperature rise of the carrier 11 can be further suppressed.

Also, in the carrier 11, the inner beam part 31 includes the central recessed part 92 recessed in the disc rotation axis direction outside the central convex part 101 in the disc radial direction. Therefore, an increase in weight can be suppressed while improving the rigidity of the inner beam part 31 of the carrier 11. Also, since the inner beam part 31 becomes even more uneven in shape due to the central recessed part 92, a surface area of the carrier 11 becomes larger, and an airflow becomes more easily disturbed, and thereby a heat transfer coefficient due to convection is improved. Therefore, a temperature rise of the carrier 11 can be further suppressed. Here, the central recessed part 92 serves as a processing reference when the carrier 11 is processed. That is, the carrier 11 is processed by being brought into contact with a positioning jig of a processing machine that processes the carrier 11 at the bottom surface 93 of the central recessed part 92.

Also, in the carrier 11, the central recessed part 92 is provided at a position that does not overlap the first attachment hole 52 of the first attachment part 41 and the second attachment hole 56 of the second attachment part 42 in the disc circumferential direction. Therefore, a decrease in the rigidity of the inner beam part 31 of the carrier 11 due to the central recessed part 92 can be suppressed.

Also, in the carrier 11, the inner beam part 31 includes the first enlarged part 77 and the second enlarged part 87, which are each formed such that a gap between itself and the disc 10 becomes larger toward the disc rotation axis, at the edge portion extending in the disc circumferential direction of the back side part facing the disc 10 in the disc rotation axis direction. Therefore, an increase in weight can be suppressed while improving the rigidity of the inner beam part 31 of the carrier 11. Also, since an airflow can be caused to flow from the first enlarged part 77 and the second enlarged part 87 to the inner beam part 31 and the disc 10, it is possible to cool the carrier 11 and the disc 10.

Here, if the carrier 11 includes at least the second enlarged part 87 on the disc rotation entry side among the first enlarged part 77 and the second enlarged part 87, wind from the second enlarged part 87 generated due to rotation of the disc 10 when the vehicle moves forward can be effectively caused to flow between the disc 10 and the carrier 11. Therefore, the carrier 11 and the disc 10 can be effectively cooled.

However, of the first enlarged part 77 and the second enlarged part 87, if the carrier 11 includes the first enlarged part 77 on the disc rotation exit side in addition to the second enlarged part 87 on the disc rotation entry side, a weight of the carrier 11 can be further reduced, and the carrier 11 and the disc 10 can be further cooled.

Further, in order to further improve the rigidity of the carrier 11, the first enlarged part 77 on the disc rotation exit side may not be provided while the second enlarged part 87 on the disc rotation entry side is provided. Also, in order to even further improve the rigidity of the carrier 11, both the first enlarged part 77 and the second enlarged part 87 may not be provided.

Also, the carrier 11 includes the outer beam part 32 formed to be provided at a position facing the inner beam part 31 with the disc 10 interposed therebetween, be connected to the inner beam part 31 via the first arm part 33 and the second arm part 34, and extend in the disc circumferential direction. The outer beam part 32 includes the pair of the first outer beam part side torque receiving part 141 and the second outer beam part side torque receiving part 151 in which the pair of the lug parts 186 of the second friction pad 27 are respectively housed on both sides in the circumferential direction. Then, the outer beam part 32 includes the first outer beam protruding part 161 provided at a position overlapping the first outward protruding part 75 and protruding in a direction away from the first outward protruding part 75, and the second outer beam protruding part 162 provided at a position overlapping the second outward protruding part 85 and protruding in a direction away from the second outward protruding part 85. Therefore, the rigidity of the outer beam part 32 of the carrier 11 can be effectively improved. Also, since the outer beam part 32 becomes even more uneven in shape due to the first outer beam protruding part 161 and the second outer beam protruding part 162, a surface area of the carrier 11 becomes larger, and an airflow becomes more easily disturbed, and thereby a heat transfer coefficient due to convection is improved. Therefore, a temperature rise of the carrier 11 can be further suppressed.

Industrial Applicability

According to each of the above-described aspects, it is possible to effectively improve a rigidity of a carrier. Therefore, industrial applicability is high.

REFERENCE SIGNS LIST

1 Disc brake
10 Disc

11 Carrier
12 Caliper
23 First friction pad (friction pad)
27 Second friction pad (friction pad)
30 Knuckle (wheel support part, non-rotating part)
31 Inner beam part
32 Outer beam part
33 First arm part (arm part)
34 Second arm part (arm part)
41 First attachment part (attachment part)
42 Second attachment part (attachment part)
51 First attachment surface (attachment surface)
52 First attachment hole (hole)
55 Second attachment surface (attachment surface)
56 Second attachment hole (hole)
71 First inner beam part side torque receiving part (inner beam part side torque receiving part)
75 First outward protruding part
76 First thick part (thick part)
77 First enlarged part (enlarged part)
81 Second inner beam part side torque receiving part (inner beam part side torque receiving part)
85 Second outward protruding part
86 Second thick part (thick part)
87 Second enlarged part (enlarged part)
92 Central recessed part
101 Central convex part
102 Outward concave part
111 First caliper support hole
114 First arm intermediate reinforcing part
121 Second caliper support hole
124 Second arm intermediate reinforcing part
161 First outer beam protruding part (outer beam protruding part)
162 Second outer beam protruding part (outer beam protruding part)
186 Lug part

The invention claimed is:

1. A disc brake braking a disc rotating together with a wheel of a vehicle, comprising:

a caliper pressing a pair of friction pads toward the disc in a rotation axis direction of the disc; and a carrier connected to a wheel support part supporting the wheel of the vehicle and disposed to straddle the disc in the rotation axis direction, wherein the carrier includes an arm part and an inner beam part, the arm part extends to straddle an outer circumferential side of the disc in the rotation axis direction and is connected to the inner beam part to support the caliper, the inner beam part extends in a circumferential direction with respect to the rotation axis of the disc to be connected to the arm part, is provided at a position facing the wheel support part, and includes a pair of inner beam part side torque receiving parts, an attachment part, and a first outward protruding part, the pair of inner beam part side torque receiving parts are provided inside the arm part in a radial direction of the disc and provided on both sides in the circumferential direction so that a pair of lug parts provided on a first friction pad of the pair of friction pads are respectively housed therein, the attachment part is provided inside the pair of inner beam part side torque receiving parts in the radial direction and is disposed at a position overlapping each of the pair of inner beam part side torque receiving parts in the circumferential direction to be connected to the wheel support part, and the first outward protruding part is formed to protrude toward the wheel support part with respect to an attachment surface of the attachment part in the rotation axis direction and extend from an edge of the attachment surface of the attachment part toward the arm part close to the attachment part.

2. The disc brake according to claim 1, wherein the first outward protruding part is provided further outward from the first caliper support hole in the circumferential direction as it approaches a first caliper support hole, which is provided in a first arm part of a pair of the arm parts closer to a first attachment part which is one of a pair of the attachment parts, in the radial direction.

3. The disc brake according to claim 2, wherein the first arm part includes a first arm intermediate reinforcing part provided to extend in the circumferential direction from the first caliper support hole provided in the first arm part to a position overlapping the first outward protruding part.

4. The disc brake according to claim 3, wherein at least a part of the first outward protruding part is provided at a position overlapping the first arm intermediate reinforcing part when viewed in the rotation axis direction.

5. The disc brake according to claim 1, wherein the first outward protruding part is provided on a rotation exit side of the disc in the inner beam part.

6. The disc brake according to claim 1, wherein the inner beam part includes a second outward protruding part extending from a second attachment part of a pair of the attachment parts different from a first attachment part closer to the first outward protruding part toward a second arm part of a pair of the arm parts closer to the second attachment part along an edge portion of the inner beam part, and protruding to the wheel support part side with respect to the attachment part in the rotation axis direction.

7. The disc brake according to claim 6, wherein the second outward protruding part is provided further outward from a second caliper support hole in the circumferential direction as it approaches the second caliper support hole provided in the second arm part in the radial direction.

8. The disc brake according to claim 7, wherein the second arm part includes a second arm intermediate reinforcing part provided to extend in the circumferential direction from the second caliper support hole to a position overlapping the second outward protruding part.

9. The disc brake according to claim 8, wherein at least a part of the second outward protruding part is provided at a position overlapping the second arm intermediate reinforcing part when viewed in the rotation axis direction.

10. The disc brake according to claim 1, wherein the inner beam part includes a central convex part provided across a pair of the attachment parts in the circumferential direction, provided inside the inner beam part in the radial direction, and protruding to the wheel support part side with respect to the pair of the attachment parts in the rotation axis direction.

11. The disc brake according to claim 10, wherein the central convex part is provided to extend toward a portion between the attachment part and the inner beam part side torque receiving part in the circumferential direction and overlap a hole of the attachment part in position in the circumferential direction.

12. The disc brake according to claim 11, wherein the central convex part includes an outward concave part recessed in the rotation axis direction inside the first outward protruding part in the circumferential direction.

13. The disc brake according to claim 10, wherein the inner beam part includes a central recessed part recessed in the rotation axis direction outside the central convex part in the radial direction.

14. The disc brake according to claim 13, wherein the central recessed part is provided at a position that does not overlap a hole of the attachment part in the circumferential direction.

15. The disc brake according to claim 10, wherein the inner beam part includes an enlarged part, which is formed such that a gap between itself and the disc becomes larger toward the rotation axis, at an edge portion extending in the circumferential direction of a back side part facing the disc in the rotation axis direction.

16. The disc brake according to claim 15, wherein the enlarged part is provided on a rotation entry side of the disc in the inner beam part.

17. The disc brake according to claim 16, wherein the enlarged part is provided on a rotation exit side of the disc in the inner beam part.

18. The disc brake according to claim 1, wherein the carrier includes an outer beam part which is formed to be provided at a position facing the inner beam part with the disc interposed therebetween, be connected to the inner beam part via the arm part, and extend in the circumferential direction, the outer beam part including:

a pair of outer beam part side torque receiving parts in which a pair of lug parts of a second friction pad are respectively housed on both sides in the circumferential direction; and an outer beam protruding part provided at a position overlapping the first outward protruding part of the inner beam part and protruding in a direction away from the first outward protruding part.

19. A disc brake braking a disc rotating together with a wheel of a vehicle, comprising:

a caliper pressing a pair of friction pads toward the disc in a rotation axis direction of the disc; and a carrier attached to a non-rotating part supporting the wheel of the vehicle and disposed to straddle the disc in the rotation axis direction, wherein the carrier includes an arm part and an inner beam part, the arm part extends to straddle an outer circumferential side of the disc in the rotation axis direction to be connected to the inner beam part, and is provided at each of positions spaced apart in a disc circumferential direction which is a circumferential direction with respect to the rotation axis of the disc to support the caliper, the inner beam part extends in the disc circumferential direction to be connected to the arm part, is provided between the non-rotating part and the disc, and includes a pair of inner beam part side torque receiving parts, an attachment part, and a thick part, the pair of inner beam part side torque receiving parts are provided on both sides in the disc circumferential direction so that a pair of lug parts provided on a first friction pad of the pair of friction pads are respectively placed therein, the attachment part is provided on a side in a disc center direction, which is a center of rotation of the disc, with respect to the pair of inner beam part side torque receiving parts, and is disposed at a position overlapping each of the pair of inner beam part side torque receiving parts in the disc circumferential direction to be connected to the non-rotating part, and the thick part is provided between the attachment part and the arm part close to the attachment part in the disc circumferential direction, is formed to be thicker in the rotation axis direction than an inner beam part side torque receiving part of the pair of inner beam part side torque receiving parts closer to the attachment part, and is provided at a position overlapping a part of the arm part when viewed from the rotation axis direction.

20. A carrier of a disc brake braking a disc rotating together with a wheel of a vehicle, comprising:

an arm part extending to straddle an outer circumferential side of the disc in a rotation axis direction of the disc and supporting a caliper pressing a pair of friction pads toward the disc in the rotation axis direction; and an inner beam part extending in a circumferential direction of the disc to be connected to the arm part, provided at a position facing a wheel support part supporting the wheel of the vehicle, and including a pair of inner beam part side torque receiving parts, an attachment part, and a first outward protruding part, wherein the pair of inner beam part side torque receiving parts are provided inside the arm part in a radial direction of the disc and provided on both sides in the circumferential direction so that a pair of lug parts provided on a first friction pad of the pair of friction pads are respectively housed therein, the attachment part is provided inside the pair of inner beam part side torque receiving parts in the radial direction and is disposed at a position overlapping each of the pair of inner beam part side torque receiving parts in the circumferential direction to be connected to the wheel support part, and the first outward protruding part is formed to protrude toward the wheel support part with respect to an attachment surface of the attachment part in the rotation axis direction and extend from an edge of the attachment surface of the attachment part toward the arm part close to the attachment part.

* * * * *